United States Patent
Kamma

(10) Patent No.: US 9,207,886 B2
(45) Date of Patent: Dec. 8, 2015

(54) RELAYING DEVICE, RELAYING METHOD, IMAGE PROCESSING APPARATUS, AND IMAGE PROCESSING SYSTEM

(71) Applicant: BROTHER KOGYO KABUSHIKI KAISHA, Nagoya-shi, Aichi-ken (JP)

(72) Inventor: Yui Kamma, Kasugai (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/454,210

(22) Filed: Aug. 7, 2014

(65) Prior Publication Data

US 2015/0043036 A1 Feb. 12, 2015

(30) Foreign Application Priority Data

Aug. 9, 2013 (JP) ................................ 2013-166089

(51) Int. Cl.
*G06F 3/12* (2006.01)
*H04N 1/00* (2006.01)

(52) U.S. Cl.
CPC .............. *G06F 3/1206* (2013.01); *G06F 3/121* (2013.01); *G06F 3/1245* (2013.01); *G06F 3/1247* (2013.01); *G06F 3/1288* (2013.01); *H04N 1/00244* (2013.01); *H04N 2201/0024* (2013.01); *H04N 2201/0094* (2013.01)

(58) Field of Classification Search
CPC .................................................. G06F 3/1206
See application file for complete search history.

(56) References Cited

U.S. PATENT DOCUMENTS

| 9,001,340 B2* | 4/2015 | Miyazawa ................... 358/1.13 |
| 2002/0051200 A1* | 5/2002 | Chang et al. ................. 358/1.15 |
| 2005/0203682 A1* | 9/2005 | Omino et al. .................... 701/24 |
| 2008/0024820 A1 | 1/2008 | Ohtomo |

FOREIGN PATENT DOCUMENTS

| JP | 2005-269250 A | 9/2005 |
| JP | 2008-33460 A | 2/2008 |
| JP | 2009-140191 A | 6/2009 |

* cited by examiner

*Primary Examiner* — King Poon
*Assistant Examiner* — Ibrahim Siddo
(74) *Attorney, Agent, or Firm* — Merchant & Gould PC

(57) ABSTRACT

A relaying device is configured to obtain first data received from one of an image processing apparatus and a server apparatus via a communication unit, convert the first data having a first format to second data having a second format, transmit the second data to the other of the image processing apparatus and the server apparatus. When the transmission process is abnormally terminated, process identification information is transmitted to the image processing apparatus, and the process identification information and the second data are stored in associated manner, and a re-start instruction including the process identification information identifying the transmission process to be re-started is received from the image processing apparatus. When the transmission process is abnormally terminated and the re-start instruction is received, second data associated with the process identification information is obtained, which is transmitted to the other of the image processing apparatus and the server apparatus.

2 Claims, 11 Drawing Sheets

RELAYING DEVICE, RELAYING METHOD, IMAGE PROCESSING APPARATUS, AND IMAGE PROCESSING SYSTEM

CROSS-REFERENCE TO RELATED APPLICATION

This application claims priority under 35 U.S.C. §119 from Japanese Patent Applications No. 2013-166089 filed on Aug. 9, 2013. The entire subject matter of the application is incorporated herein by reference.

BACKGROUND

1. Technical Field

The present disclosure relates to a relaying device configured to relay data from one of an image processing apparatus and a server apparatus connected via a communication network to the other. The present disclosure also relates to a relaying method for the relaying device, an image processing system having such an image processing apparatus, the server and the relaying device.

2. Related Art

A data storage service in which data is stored in a storage server on a communication network has been known. Further, there has also been known a commercial service in which an image processing apparatus having a printer, a scanner or the both is connected to the storage server via a relaying device, and transmits data between the image processing apparatus and the storage server.

An example of such a commercial service is to convert image data generated by the scanner of the image processing apparatus into document data by the relaying device, and the document data is uploaded to the storage server of an data storage service. Another example is to convert the document data stored in the storage server of the data storage service into image data by the relaying device and download into the image processing device, then the image represented by the image data is printed by the printer of the image processing apparatus.

With use of such a service, the image processing apparatus can transmit or receive data, which has a data format the image processing apparatus does not support (e.g., document data), to or from the storage server. Further, the image processing apparatus is not required to have a function of directly upload the document data to the storage server, or directly download the image data from the storage server.

SUMMARY

In the above-described conventional service, if the upload/download process is aborted (i.e., abnormally terminated) due to some trouble in communication between the relaying device and the storage server, the image processing apparatus cannot determine that the upload/download process has been aborted, and therefore, cannot control the system to re-execute the upload/download process. Further, if such abortion is due to a malfunction of the image processing apparatus (e.g., running short of sheets, inks, toner and the like), it is not appropriate that the relaying device automatically re-executes the upload/download process unless the relaying device determines that the malfunction disappears.

In consideration of above problems, according to aspects of the disclosure, there is provided a relaying device enabling a re-execution of transmission/reception of data between an image processing apparatus and a server apparatus at a timing designated by the image processing apparatus.

According to aspects of the invention, there is provided a relaying device configured to transmit data from one of an image processing apparatus and a server apparatus interconnected through a communication network to the other. The relaying device has a communication unit, a storage unit, and a controller. The controller is configured to receive first data received from one of the image processing apparatus and the server apparatus via the communication unit, execute a conversion process of converting the first data having a first format to second data having a second format which is different from the first format, and execute a transmission process of causing the communication unit to transmit the second data to the other of the image processing apparatus and the server apparatus. On condition that the transmission process is abnormally terminated, the controller causes the communication unit to transmit process identification information identifying the transmission process which is abnormally terminated to the image processing apparatus, cause the storage unit to store the process identification information and the second data in associated manner, receive a re-start instruction which is received from the image processing apparatus via the communication unit, the re-start instruction including the process identification information identifying the transmission process to be re-started. Further, on condition that the transmission process is abnormally terminated and the re-start instruction is received, the controller executes a re-start process which obtains converted second data associated with the process identification information from the storage unit, and cause the communication unit to transmit the obtained second data to the other of the image processing apparatus and the server apparatus.

According to further aspects of the invention, there is provided a relaying device connected to an image processing apparatus through a communication network. The relaying device has a communication unit, a storage unit and a controller. The controller is configured to receive first data from the image processing apparatus via the communication unit, execute a conversion process of converting the first data having a first format to second data having a second format which is different from the first format, execute a transmission process of causing communication unit to transmit the second data to the image processing apparatus. On condition that the transmission process is abnormally terminated, the controller causes the communication unit to transmit process identification information identifying the transmission process which is abnormally terminated to the image processing apparatus, cause the storage unit to store the process identification information and the second data in associated manner, and receive a re-start instruction which is received from the image processing apparatus via the communication unit, the re-start instruction including the process identification information identifying the transmission process to be re-started. On condition that the transmission process is abnormally terminated and the re-start instruction is received, the controller executes a re-start process which obtains second data associated with the process identification information from the storage unit, and cause the communication unit to transmit the obtained second data to the image processing apparatus and the server apparatus.

According to furthermore aspects of the invention, there is provided an image processing apparatus configured to be connected to a server apparatus and a relaying device through a communication network, the relaying device being configured to relay data from one of the image processing apparatus and the server apparatus to the other through the network, the relaying device having a first communication unit, a first storage unit, and a first controller. The first controller is configured to receive first data from one of the image processing apparatus and the server apparatus via the communication unit, execute a conversion process of converting the first data having a first format to second data having a second format which is different from the first format, execute a transmission process of causing the communication unit to transmit the second data to the other of the image processing apparatus and the server apparatus. On condition that the transmission process is abnormally terminated, the controller may further cause the communication unit to transmit process identification information identifying the transmission process which is abnormally terminated to the image processing apparatus, cause the storage unit to store the process identification information and the second data in associated manner, receive a re-start instruction which is received from the image processing apparatus via the communication unit, the re-start instruction including the process identification information identifying the transmission process to be re-started. On condition that the transmission process is abnormally terminated and the re-start instruction is received, the controller may further execute a re-start process which obtains second data associated with the process identification information from the storage unit, and cause the communication unit to transmit the obtained second data to the other of the image processing apparatus and the server apparatus. Further, the image processing apparatus has a second communication unit, an operation unit configured to detect an operation to select an object displayed on a display screen, a second storage unit, and a second controller. The second controller is configured to cause the second communication unit to transmit the first data to the relaying device or cause the second communication unit to receive the second data from the relaying device, receive the process identification information received from the relaying device via the second communication unit, and cause the second storage unit to store the process identification information. On condition that a selection of a re-start instruction object displayed on the display screen is detected by the operation unit, the second controller may cause the second communication unit to transmit the re-start instruction including the process identification information stored in the second storage unit to the relaying device.

According to further aspects of the invention, there is provided a relaying method of relaying data from one of an image processing apparatus and a server apparatus interconnected through a communication network to the other. The relaying method includes receiving first data from one of the image processing apparatus and the server apparatus via the communication unit, converting the first data having a first format to second data having a second format which is different from the first format, executing a transmission process of causing communication unit to transmit the second data to the other of the image processing apparatus and the server apparatus. On condition that the transmission process is abnormally terminated, the method may further include transmitting process identification information identifying the transmission process which is abnormally terminated to the image processing apparatus, storing the process identification information and the second data in associated manner, and receiving a re-start instruction which is received from the image processing apparatus, the re-start instruction including the process identification information identifying the transmission process to be re-started. On condition that the transmission process is abnormally terminated and the re-start instruction is received, the method further include executing a re-start process which obtains second data associated with the process identification information, and transmit the second data to the other of the image processing apparatus and the server apparatus.

According to further aspects of the invention, there is provided an image processing system having an image processing apparatus, a server apparatus and a relaying device interconnected through a communication network, the relaying device being configured to relay data from one of the image processing apparatus and the server apparatus to the other through the network. The relaying device has a first communication unit, a first storage unit, and a first controller. The first controller is configured to receive first data from one of the image processing apparatus and the server apparatus via the communication unit, execute a conversion process of converting the first data having a first format to second data having a second format which is different from the first format, execute a transmission process of causing the communication unit to transmit the second data to the other of the image processing apparatus and the server apparatus, on condition that the transmission process is abnormally terminated, cause the communication unit to transmit process identification information identifying the transmission process which is abnormally terminated to the image processing apparatus, cause the storage unit to store the process identification information and the second data in associated manner, receive a re-start instruction which is received from the image processing apparatus via the communication unit, the re-start instruction including the process identification information identifying the transmission process to be re-started, and, on condition that the transmission process is abnormally terminated and the re-start instruction is received, execute a re-start process which obtains second data associated with the process identification information from the storage unit, and cause the communication unit to transmit the obtained second data to the other of the image processing apparatus and the server apparatus. Further, the image processing apparatus has a second communication unit, an operation unit configured to detect an operation to select an object displayed on a display screen, a second storage unit, and a second controller. The second controller is configured to cause the second communication unit to transmit the first data to the relaying device or cause the second communication unit to receive the second data from the relaying device, receive the process identification information received from the relaying device via the second communication unit, cause the second storage unit to store the process identification information, and, on condition that a selection of a re-start instruction object displayed on the display screen is detected by the operation unit, cause the second communication unit to transmit the re-start instruction including the process identification information stored in the second storage unit to the relaying device.

BRIEF DESCRIPTION OF THE ACCOMPANYING DRAWINGS

DETAILED DESCRIPTION OF THE EMBODIMENTS

Hereinafter, illustrative embodiments according to the invention will be described with reference to the drawings. It is noted that the illustrative embodiments describe below are merely examples and can be modified in various ways without departing from the scope of the invention.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs ("RAM" is an abbreviation for "random access memory"), ROMs ("ROM" is an abbreviation for "read only memory"), flash memories, EEPROMs ("EEPROM" is an abbreviation for "electrically erasable programmable read only memory"), CD-media ("CD" is an abbreviation for "compact disc"), DVD-media ("DVD" is an abbreviation for "digital versatile disc"), temporary storages, hard disk drives, floppy drives, permanent storages, and the like.

Figure 1:
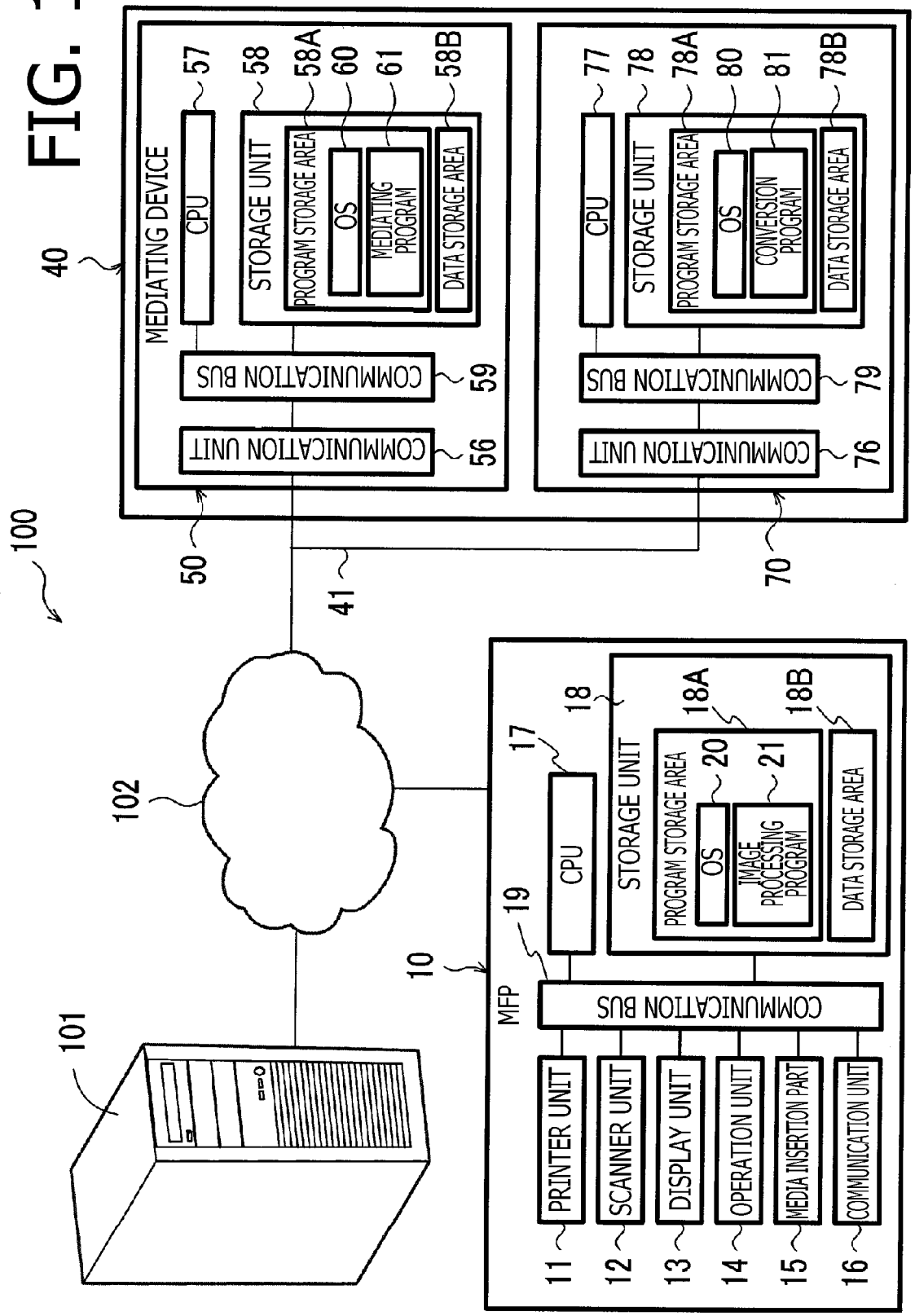
FIG. 1 is a block diagram schematically showing a configuration of a data management system according to a first illustrative embodiment of the invention.

FIG. 1 shows a data management system 100 according to an illustrative embodiment of the invention has an MFP ("MFP" is an abbreviation for "multi-function peripheral") 10, a relaying device 40 and a service providing apparatus 101. The MFP 10, the relaying device 40 and the serving providing apparatus 101 are communicatably interconnected via the Internet 102.

The MFP 10, the relaying device 40 and the serving providing apparatus 101 are configured to communicate with each other using, for example, the HTTP ("HTTP" is an abbreviation for "hypertext transfer protocol") or the HTTPS ("HTTPS" is an abbreviation for "hypertext transfer protocol secure"). Specifically, the MFP 10 serves as an HTTP client, and the service providing apparatus 101 serves as an HTTP server. The relaying device 40 operates as the HTTP server when communicating with the MFP 10, and operates as the HTTP server when communicating with the service providing apparatus 101. With such a configuration, the relaying device can communicate with the MFP 10 and the service providing apparatus 101 without being blocked by a firewall or the like implemented to the MFP 10.

<Service Providing Apparatus>

The service providing apparatus 101 is provided on the Internet by a service provider providing a data storage service. The data storage service is a service to store any data a user of the service (hereinafter, referred to as a service user) has in the service providing apparatus 101. Well known examples of such a data storage service are Evernote (registered trademark of EVERNOTE CORPORATION), Google (registered trademark of Google Inc.) Docs, PICASA (registered trademark of Google Inc.), Facebook (registered trademark of Facebook, Inc.). The service user is allowed to upload or download data to/from an assigned storage area through the Internet 102. The service providing apparatus 101 stores the data on a file basis.

<MFP>

The MFP 10 has a printer unit 11, a scanner unit 12, a display unit 13, an operation unit 14, a media slot 15, a communication unit 16, a CPU ("CPU" is an abbreviation for "central processing unit") 17 and a storage unit 18 as shown in FIG. 1. Such components of the MFP 10 are interconnected through a communication bus 19. The printer unit 11 is configured to execute a print process in which images represented by image data are printed on printing sheets in accordance with a well-know image forming method such as inkjet printing method or an electrophotographic image forming method. The scanner unit 12 is configured to execute a scanning process in which the scanner unit 12 scans images formed on original sheets and generate image data representing the images. The MFP 10 may further has a printer function of printing images represented by image data, which is generated by the scanner unit 12, on the printing sheets by the printer unit 11. The MFP 10 may also has a facsimile function of transmitting/receiving facsimile messages.

<Display Unit>

The display unit 13 has a displaying screen which can display various pieces of information. According to the illustrative embodiment, it is not necessary to limit the configuration of the display unit 13 to specific ones, and LCD ("LCD" is an abbreviation for "liquid crystal display"), an organic EL ("EL" is an abbreviation for "electro-luminescence") display and the like can be employed as the display unit 13.

<Operation Unit>

The operation unit 14 is configured to detect a user operation to select an object displayed on the displaying screen of the display unit 13. Specifically, the operation unit 14 has, for example, a plurality of depression buttons, and the operation unit 14 transmits operation signals respectively corresponding to the plurality of buttons to the CPU 17 upon operation of one of the buttons. Alternatively or optionally, the display unit 13 may be configured as a touch panel display, that is, the operation unit 14 may have a touch panel overlaid on the displaying screen of the display unit 13. As a touch sensor, a well-known type of touch sensor (i.e., a capacitance type touch sensor, or a resistive type touch sensor) can be employed. It is noted that, when the touch sensor is employed, the depression buttons may be omitted, and the touch sensor also serves as such buttons.

<Media Slot>

The media slot 15 is configured such that a memory medium can be detachably attached thereto. The CPU 17 of the MFP 10 can retrieve data stored in the memory medium attached to (i.e., inserted in) the media slot 15 and/or store data in the memory medium attached to the media slot 15. According to the illustrative embodiment, a type of the memory medium may not be limited to specific ones, and examples of such a memory medium are a flash memory card, a CD-ROM and a DVD-ROM.

<Communication Unit>

The communication unit 16 is an interface enabling a communication with external devices via the Internet 102. For example, the MFP 10 receives data from the relaying device 40 through the communication unit 16, or transmits data to the relaying device 40 through the communication unit 16. According to the illustrative embodiment, the communication method of connecting the communication unit 16 to the Internet 102 is either wireless communication method or wired communication method.

<CPU>

The CPU 17 controls the entire operation of the MFP 10. Specifically, the CPU 17 retrieves various programs from the storage 18 and executes the same based on the operation signal output by the operation unit 14 and/or various instructions/information received from the relaying device 40 through the communication unit 16.

<Storage>

The storage has a program storage area 18A and a data storage area 18B. The program storage area 18A stores an OS ("OS" is an abbreviation for "operating system") 20 and an image processing program 21. The image processing program 21 may be a single program or a collective of a plurality of programs. So are a mediating program 61 and a conversion program 81, which will be described later. The data storage area 18B stores data necessary for executing the image processing program 21.

The storage 18 may include a RAM (random access memory), a ROM (read only memory), an EEPROM (electrically erasable programmable read only memory), an HDD (hard disk drive), and a buffer provided to the CPU 17 and/or combination thereof. Alternatively or optionally, the storage 18 may be a computer-readable storage medium (i.e., a non-transitory storage medium), which may include storage devices such as the CD-ROM, the DVD-ROM and the like, in addition to the above-described devices. It is noted that electrical signals carrying programs downloaded from a server on the Internet are not included in the non-transitory storage medium.

The programs stored in the program storage area 18A are executed by the CPU 17. In the following description, operation of each program may be described without mentioning the CPU 17. That is, instead of stating that "the CPU 17 executes a process A described in a program A", it will be stated that "Program A executes process A" for brevity.

The OS 20 is a basic program which provides an API (application programming interface) to control the printer unit 11, the scanner unit 12, the display unit 13, the operation unit 14, the media insertion unit 15 and the communication unit 16, which are hardware components constituting the MFP 10. In other words, the programs mentioned above calls the API provided by the OS 20 and controls the hardware components. In the following description, each program will be described with omitting the description regarding the OS for brevity. For example, instead of stating that "a program B controls hardware C through the API of the OS 20", it will be simply stated that "the program B controls the hardware C".

In the following description, instead of stating that "a program C causes the communication unit 16 to transmit data, information or instruction", it will be simply stated that "the program C transmits the data, information or instruction" for brevity. Similarly, instead of stating that "a program D obtains data, information or instruction received by the communication unit 16", it will be simply stated that "the program causes the communication unit 16 to received the data, information or instruction" for brevity.

<Relaying Device>

The relaying device 40 includes the mediating device 50 and the conversion device 70 connected through a LAN ("LAN" is an abbreviation for "local area network") 41 as shown in FIG. 1. The mediating device 50 and the conversion device 70 are communicatable with each other through the LAN 41, and further connected to the Internet 102 through the LAN 41. The mediating device 50 operates as the HTTP server when communicating with the MFP 10, and operates as the HTTP client when communicating with the conversion device 70 and the service providing apparatus 101. The conversion device 70 operates as the HTTP server when communicating with the MFP 10 and the mediating device 50. The LAN 41 is an example of a communication network. According to the illustrative embodiments, the relaying device 40 includes physically separated two devices (i.e., the mediating device 50 and the conversion device 70). However, such a configuration is only an example, and the relaying device 40 may be configured with a single computer.

The mediating device 50 is a computer having a communication unit 56, a CPU 57 and a storage 58 which are interconnected through a communication bus 59. Since functions of the communication unit 56, the CPU 57, the storage 58 and the communication bus 59 are similar to the communication unit 10, the CPU 17, the storage 18 and the communication bus 19 of the MFP 10, detailed description thereof will not be repeated for brevity. It is noted that in a program storage area 58A of the storage 58, an OS 60 and a mediating program 61 are stored.

The conversion device 70 is a computer having a communication unit 76, a CPU 77 and a storage 78 which are interconnected through a communication bus 79. Since functions of the communication unit 76, the CPU 77, the storage 78 and the communication bus 79 are similar to the communication unit 10, the CPU 17, the storage 18 and the communication bus 19 of the MFP 10, detailed description thereof will not be repeated for brevity. It is noted that in a program storage area 78A of the storage 78, an OS 80 and a conversion program 81 are stored.

First Illustrative Embodiment

Hereinafter, a first illustrative embodiment will be described, referring to FIGS. 2-6.

<Operation of Data Management System>

According to the first illustrative embodiment, pre-convert data is transmitted from the MFP 10 to the relaying device 40, which converts the pre-convert data to post-convert data. The post-convert data is then transmitted from the relaying device 40 to the service providing apparatus 101. This process will be referred to as an "Office Doc Creator" process.

Figure 7A:
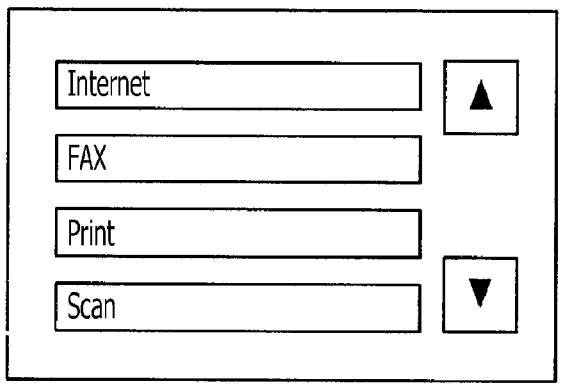
FIGS. 7A and 7B are examples of waiting screen displayed on a display unit of an MFP ("MFP" is an abbreviation for "multi-function peripheral") of the data management system according to the first illustrative embodiment.

The image processing program 21 running on the MFP 10 displays a waiting screen on the display unit 13 (S11) on condition that the MFP 10 is powered on, or the MFP 10 is restored from a sleep state to an active state. Specifically, the image processing program 21 determines whether a re-start instruction information is stored in the data storage area 18B (see FIG. 5A; S11A). When the re-start instruction information is not stored (S11A: NO), the image processing program 21 displays a waiting screen as shown in FIG. 7A on the display unit 13 (S11C). When the re-start instruction information is stored in the data storage area 18A (S11A: YES), S11B is executed, which will be described later.

In the waiting screen shown in FIG. 7A, a plurality of objects (i.e., "Internet", "FAX", "Print" and "Scan") representing functions of the MFP 10 are included. An object "Internet" is for causing the MFP 10 to execute data transmission/reception process between the MFP 10 and the service providing apparatus 101 via the relaying device 40. An object "FAX" is for causing the MFP 10 to execute facsimile transmission. An object "Print" is for causing the printer unit 11 of the MFP 10 to execute a print process. An object "Scan" is for causing the scanner unit 12 of the MFP 10 to execute a scan process.

In the description, a term "object" represents an image which a user can select by operation the operation unit 14. For example, objects may be a plurality of character strings displayed on the display unit 13. As the user operates direction keys of the operation panel 14, one of the objects (i.e., character strings) may be highlighted on the display unit 13. Further, when the user depresses an enter button of the operation unit 14, the highlighted character string may be selected. For another example, when the operation unit 14 is a touch panel, and a plurality of objects may include icons, buttons, links and the like displayed on the display unit 13 (i.e., touch panel 14), and the user may directly select one of the objects by directly touch one of the displayed icons, buttons, links and the like.

Next, the image processing program 21 generates an Internet identification information (S12) on condition that the operation unit 14 detects an operation to select the object "Internet" displayed on the display unit 13. Then, the image processing program 21 transmits the generated Internet identification information to the mediating device 50 (S13). The Internet identification information is information used to notify the relaying device 40 of selection of the "Internet" object. It is noted that the Internet identification information is an example of a start instruction which causes the data transmission/reception process between the MFP 10 and the service provided apparatus via the relaying device 40. It is also noted that the process shown in FIG. 5B is a process when the re-start instruction information is stored in the data storage area, which will be described later. When the "FAX" object, "Print" object or "Scan" object is selected, the similar operation is executed. Because of the similarity, description thereof is omitted for brevity.

Next, the mediating program 61 of the mediating device 50 generates a service selection screen data (S14) on condition that the mediating device 50 acquires the Internet identification information. Then, the mediating program 61 transmits the generated service selection screen data to the MFP 10 (S15).

Figure 7B:
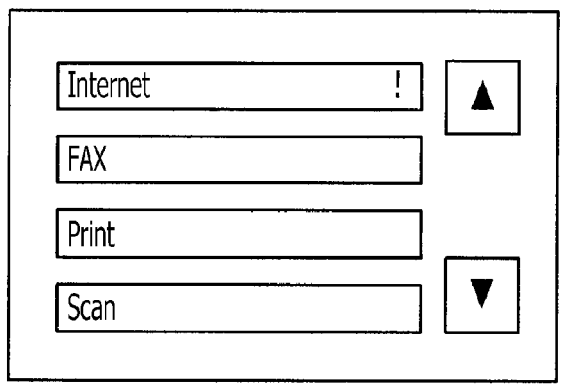
Figure 7C:
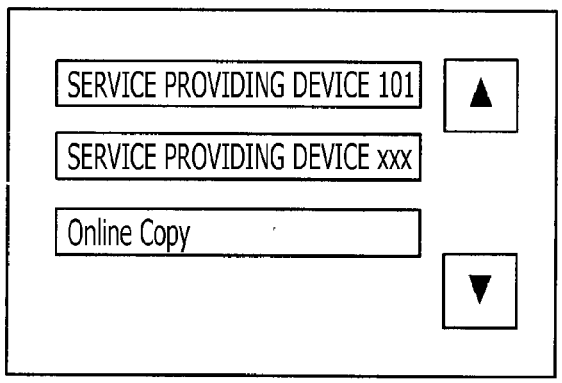
FIGS. 7C and 7D are examples of service selection screen displayed on the display unit of the MFP of the data management system according to the first illustrative embodiment.

Next, the image processing program 21 of the MFP 10 displays the service selection screen represented by the service selection screen data on the display unit 13 (S16) on condition that the service selection screen data is received. For example, on the display unit 13, the service selection screen as shown in FIG. 7C is displayed. In this example shown in FIG. 7C, three objects (i.e., "Service Providing Apparatus 101", "Service Providing Apparatus xxx" and "Online Copy") are included in the service selection screen. The following description on the first illustrative embodiment is made assuming that the "Service Providing Apparatus 101" has been selected.

Next, on condition that the operation unit 14 detects an operation to select "Service Providing Apparatus 101" displayed on the display unit 13 (S17: NO), the image processing program 21 of the MFP 10 transmits the service identification information, which indicates that the "Service Providing Apparatus 101" is selected, to the mediating device 50 (S18). The mediating program 61 of the mediating device 50 determines whether the selected service is "Online Copy" (S19) on condition that the service identification information is received (S19). A processing when the "Online Copy" is selected (S19:YES) will be described when the third illustrative embodiment is described. When a service other than the "Online Copy" has been selected (S19: NO), the mediating program 61 transmits account selection screen data to the MFP 10 (S20).

On condition that the account selection screen data is received, the image processing program 21 of the MFP 10 causes the display unit 13 to display the account selection screen represented by the received account selection screen data (S21). Although not shown, the account selection screen allows the user to select a user account to be used to access the service providing apparatus 101 identified by the service identification information which is transmitted by the MFP 10, and thus, the account selection screen includes selectable objects.

Next, on condition that the operation unit 14 detects an operation to select one of the objects displayed on the display unit 13, the image processing program 21 transmits account identification information, which indicates selection of the selected account, to the mediating device 50 (S22). The mediation program 61 of the mediating device 50 transmit token transmission instruction to the MFP 10 (S23) on condition that the account identification information is received. The token transmission instruction is an instruction to cause the MFP 20 to send the token corresponding to the account selected on the account selection screen. It is noted that the token is an example of the account information which is necessary to obtain authentication to store data in the service providing apparatus 101 and/or to retrieve data stored in the service providing apparatus 101.

In S24, the image processing program 21 transmits the token corresponding to the selected account to the mediating device 50 on condition that the token transmission instruction is received by the CPU 17 of the MFP 10. The mediating program 61 of the mediating device 50 transmits UL/DL selection screen data to the MFP 10 on condition that the token is received (S25). Then, on condition that the UL/LD selection screen data is received, the image processing program 21 causes the display unit 13 to display a UL/DL selection screen which is represented by the UL/DL selection screen data (S26).

Although not shown, the UL/DL selection screen causes the user to select a direction in which data is transmitted between the MFP 10 and the service providing apparatus 101 via the mediating device 50. For example, in the UL/DL selection screen, two objects (i.e., "upload" and "download") may be included. When the "upload" object is selected, data is transmitted from the MFP 10 to the service providing apparatus 101, while when the "download" object is selected, data is transmitted from the service providing apparatus 101 to the MFP 10. In the following description regarding the first illustrative embodiment, it is assumed that the "upload" object is selected.

Next, on condition that an operation to select the "upload" object is detected by the operation unit 14, the image processing program 21 transmits UL/DL identification information representing that the selected object is selected to the mediating device 50 (S27). Further, on condition that the UL/DL identification information is received, the mediating program 61 determines whether the direction of the data represented by the UL/DL identification information is "upload" (S28). A process when the "download" is selected (S28: NO) will be described when the second illustrative embodiment is described.

Next, on condition that the direction represented by the UL/DL identification information is "upload", the mediating program 61 transmits scan/medium selection screen data to the MFP 10 (S31). Then, on condition that the scan/medium selection screen data is received (S28: YES), the image processing program 21 of the MFP 10 causes the display unit 13 to display a scan/media selection screen represented by the scan/medium selection screen data on the display unit (S32). It is noted that the scan/medium selection screen is a screen causing the user to select a place (device, way) from which pre-convert data is obtained, and, for example, two objects of "scan" and "medium" may be included.

Figure 10:
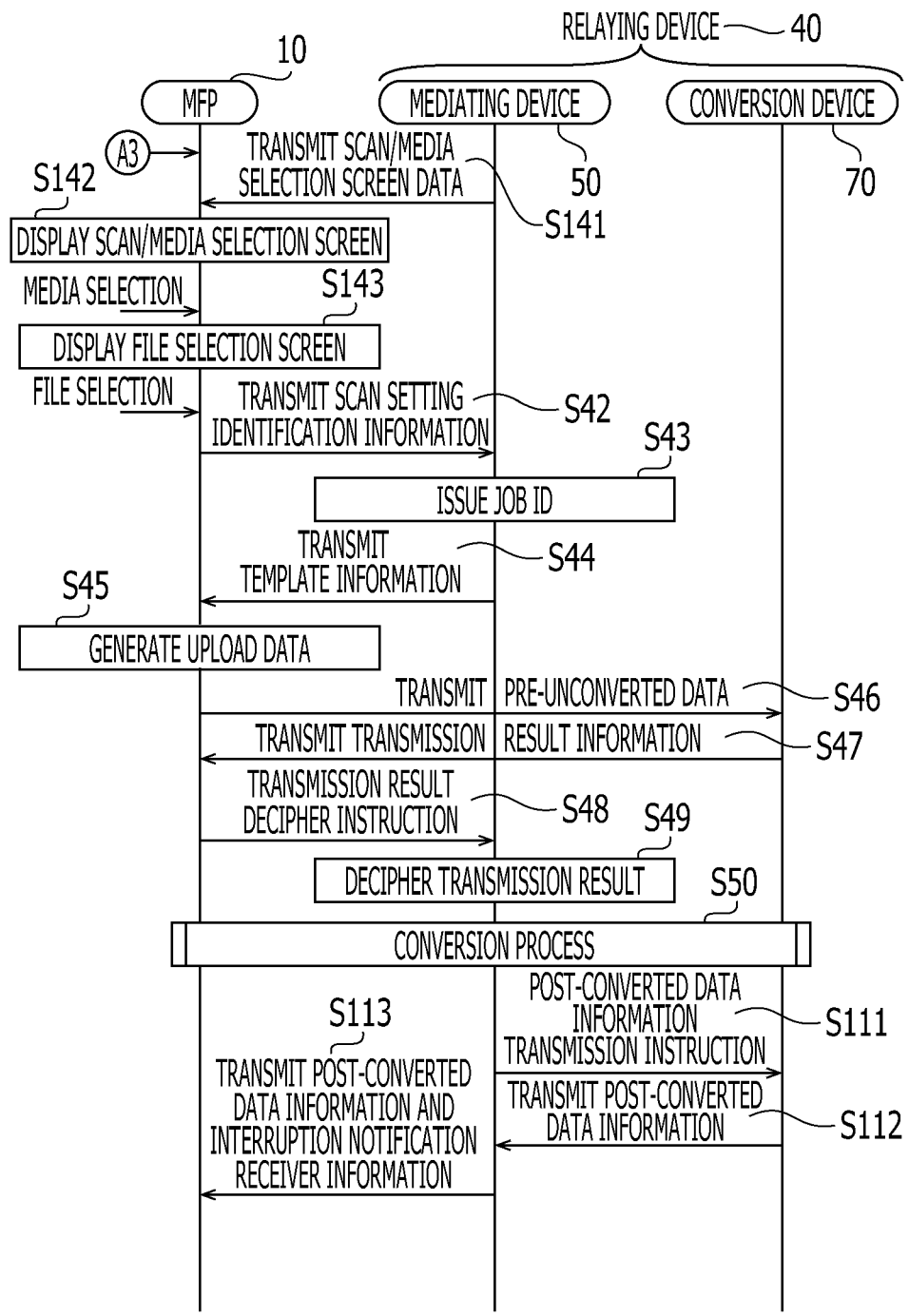
FIGS. 10 and 11 are sequence charts of a data management system according to a third illustrative embodiment.

When the "scan" object is selected, the data generated by the scanner unit 12 is used as the pre-convert data. Alternatively, when the "medium" object is selected, data stored in the recording medium inserted in the medium insertion unit 15 is used as the pre-convert data. In the following description on the first illustrative embodiment, it is assumed that the "scan" object is selected. That is, in the first illustrative embodiment, the image format is the first format. If the "medium" object is selected, steps S143 in FIG. 10 is executed instead of steps S37-S41.

Next, on condition that an operation to select the "scan" object displayed on the display unit 13 is detected by the operation unit 14, the image processing program 21 transmits the scan identification information indicating that the selected object is selected to the mediating device 50 (S33). Further, on condition that the scan identification information is received, the mediating program 61 transmits format selection screen data to the MFP 10 (S34).

In S35, on condition that the format selection screen data is received, the image processing program 21 causes the display 13 to display a format selection screen represented by the format selection screen data. Although not shown, the format selection screen is for causing the user to select a format of data after conversion, and may includes, for example, five objects of "Office", "text", "image", "PDF" and "CSV". It is noted that the five formats are merely examples, and the number and type of formats should not be limited to the described ones. In the following description on the first illustrative embodiment, it is assumed that the format of "Office" is selected. It is noted that the "Office" format in the first illustrative embodiment means that the post-convert data has a format which is normally generated by Office software provided by Microsoft® Corporation.

In S36, on condition that an operation to select the "Office" object from among the objects displayed on the display unit 13 is detected by the operation unit 14, the image processing program 21 transmits format identification information representing that the selected object is selected to the mediating device 50. Further, on condition that the format identification information is received, the mediating program 61 transmits scan setting screen data to the MFP 10 (S37). Then, on condition that the scan setting screen data is received, the image processing program 21 causes the display unit 13 to display a scan setting screen represented by the scan setting screen data (S38). Although not shown, the scan setting screen is for causing the user to select execution conditions for a scanning process by the scanner unit 12, and may include objects for allowing the user to select/set an original size, resolution, selection of monochromatic/color image, and the like.

In S39, on condition that an operation to select one of the objects displayed on the display unit 13 is detected by the operation unit 14, the image processing program 21 transmits scan setting identification information indicating that the selected object is selected to the mediating device 50. Further, on condition that the scan setting identification information is received, the mediating program 61 transmits a scan instruction to the MFP 10 (S40). The scan instruction is an instruction to cause the scanner unit 12 of the MFP 10 to execute scanning operation in accordance with an execution condition represented by the scan setting identification information. Further, on condition that the scan instruction is received, the image processing program 21 causes the scanner unit 12 to execute the scanning operation (S41). The data generated in the scanning operation is referred to as the pre-convert data in the first illustrative embodiment. The thus generated pre-convert data is stored in the data storage area 18B.

In S42, the image processing program 21 transmits template information transmission instruction to the mediating device 50. The template information transmission instruction is an instruction causing the mediating device 50 to transmit template information including stored position information representing a stored position of the pre-convert data in the converting device 70, and data structure to be transmitted to the converting device 70 including the pre-convert data. Incidentally, the stored position information may be URL (uniform resource locator) information.

Next, on condition that the template information transmission instruction is received, the mediating program 61 issues a job ID (S43). The job ID is an identifier with which steps S11-S64 shown in FIGS. 2-4 can be identified uniquely. The mediating program 61 transmits the template information to the MFP 10 (S44). Further, the job ID and the template information are stored in the data storage area 58B.

On condition that the template information is received, the image processing program 21 generates upload data by incorporating pre-convert data into the data structure indicated by the template information (S45), and transmits the upload data including the pre-convert data to the storage position indicated by the storage position information (S46). For example, the image processing program 21 may transmit the pre-convert data to the converting device 70 with use of a POST method of the HTTP. In other words, the pre-convert data is transmitted to the converting device 70 as an HTTP request.

Next, the conversion program 81 stores the pre-convert data received from the MFP 10 to the data storage area 78B, and transmits transmission result information to the MFP 10 (S47). The transmission result information is for informing the MFP 10 whether the pre-convert data has been received successfully. According to the illustrative embodiment, the transmission result information is transmitted to the MFP 10 as an HTTP response.

In S48, the image processing program 21 transmits transmission result decipher instruction to the mediating device 50 (S48) on condition that the transmission result is received. The transmission result decipher instruction is for causing the mediating device 50 to decipher the transmission result information, and the transmission result information received in S47 is added. Further, on condition that the transmission result decipher instruction is received, the mediating program 61 deciphers the transmission result information added to the transmission result decipher instruction (S49).

Figure 6:
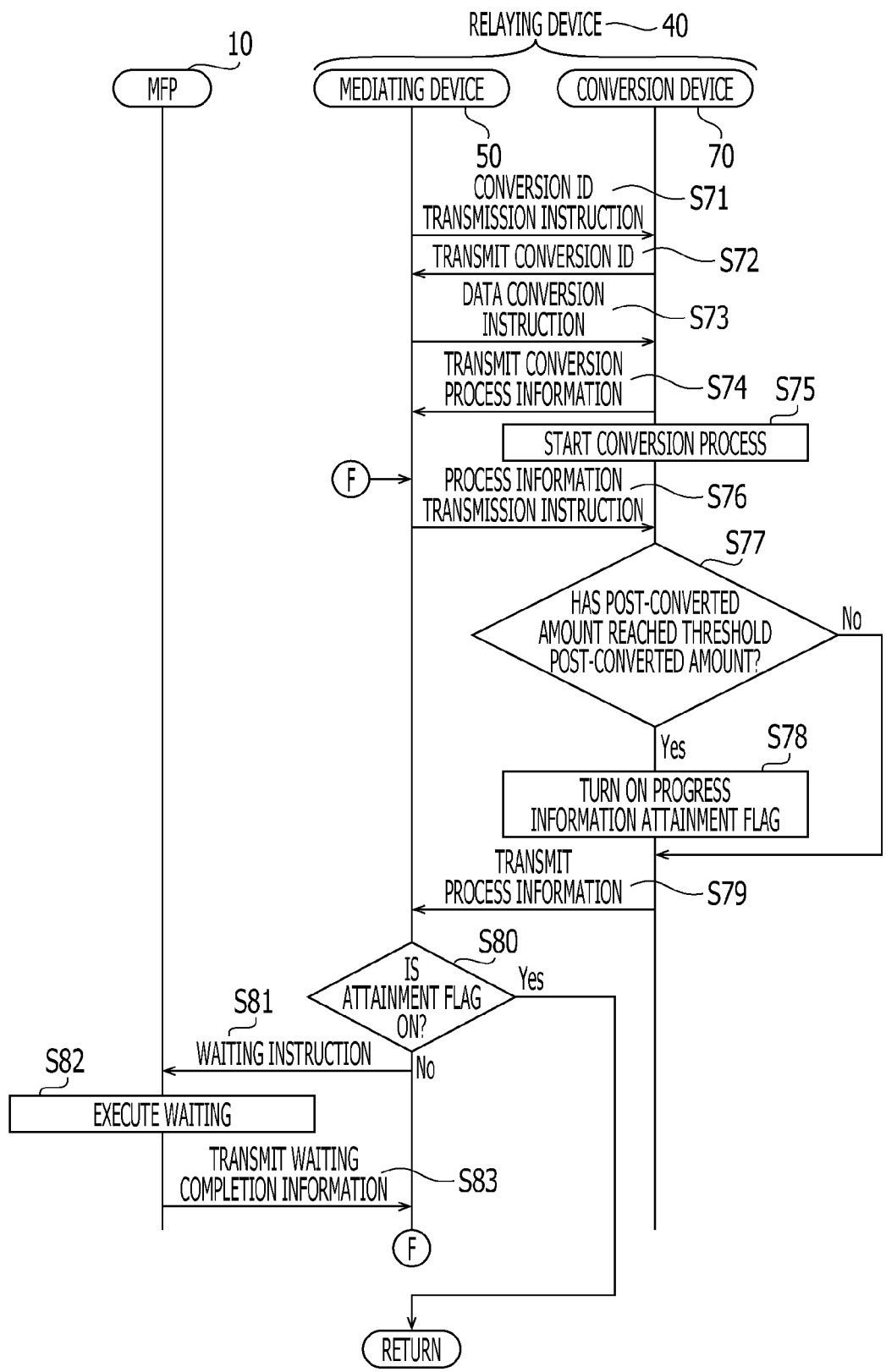
FIG. 6 is a sequence chart illustrating a conversion process.

Next, a conversion process shown in FIG. 6 is executed (S50). The conversion process is a process of converting pre-convert data having a first format to post-convert data having a second format, and mainly executed by a conversion program 81 of the converting device 70. It is noted that the conversion process is executed only when the format of the pre-convert data and the format of the post-convert data are different. When the format of the pre-convert data and the format of the post-convert data are the same, the conversion process is skipped. Further, when conversion is executed, the MFP 10, the mediating device 50 and the converting device 70 operate in association with each other under control of the mediating device 50.

Next, the conversion process (S50) will be describe in detail with reference to FIG. 6. The mediating program 61 transmits conversion ID transmission instruction, which is for causing the conversion device 70 to transmit data conversion instruction (S71). The conversion ID is an identifier used to uniquely identify a conversion process executed by the converting device 70. The conversion ID is issued by the converting device 70 and transmitted to the mediating device 50 (S72). The mediating program 61 transmits data conversion instruction to the converting device 70 (73). The conversing instruction is an instruction to cause the converting device 70 to execute a process of converting the pre-convert data the converting device 70 received in S46 to the post-convert data having a format which is identified by the data format identification information which the mediating device 50. To the data conversion instruction, the format indentification information received in S36 and the conversion ID received in S72 are added.

Next, on condition that the data conversion instruction is received from the mediating device 50, the conversion program 81 transmits the conversion process information to the mediating device 50 (S74), and starts executing the conversion process (S75). Specifically, the converting program 81 converts the pre-convert data received in S46 in accordance with the format identification information added to the data conversion instruction received in S73, and stores the thus generated post-convert data in the data storage area 78B. According to the first illustrative embodiment, the pre-convert data having the image format is converted to the post-convert data having the Office format.

In S76, the mediating program 61 transmits progress information transmission instruction to the converting device 70 after a predetermined standby period has passed. The progress information transmission instruction is an instruction causing the converting device 70 to transmit progress information representing progression status of the converting process, and includes a completion flag indicative of whether the converted amount has reached a threshold converted amount. The converted amount is, for example, the data amount of the converted portion of the pre-convert data, or the amount of the data having been generated by the converting process. The threshold converted amount corresponds to sufficient data amount of the post-convert data to execute steps S51 onwards of FIG. 4.

In S77, on condition that the progress information transmission instruction is received, the conversion program 81 compares the current converted amount with the threshold converted amount. Then, on condition that the converted amount has reached the threshold converted amount (S77: YES), the conversion program 81 transmits the progress information of which the completion flag is set to ON (S78, S79). On condition the converted amount has not reached the threshold converted amount (S77: NO), the conversion program 81 transmits the progress information of which the completion flag is set to OFF (S79).

Next, when the progress information is received, the mediating program 61 determines whether the completion flag contained in the progress information is ON (S80). On condition that the progress flag is OFF (S80: NO), the mediating program 61 transmits a wait instruction to the MFP 10 (S81). The wait instruction causes the MFP 10 to stop (or reset) a response wait timer in order to prevent time out of the response wait timer which measures a time period after the MFP 10 transmitted the transmission result decipher instruction in S48.

In S82, on condition that the wait instruction is received, the image processing program 21 executes "waiting", that is, stops progression of the response wait timer which measures a time period since the transmission result decipher instruction was sent (S22). A stop period may be a predetermined period, or may be included in the wait instruction. Then, after the "waiting" is executed, the image processing program 21 transmits a wait completion information to the mediating device 50 (S83). For another example, the image processing program 21 may cancel the reply wait time on condition that the wait instruction is received. Then, the image processing program 21 may executes the "wait" for a predetermined period (S82), and thereafter transmit the wait completion information to the mediating device 50 (S83), and re-set the response wait timer for the response to the wait completion information.

The MFP 10, the mediating device 50 and the converting device 70 repeatedly execute steps S76-S83 until the completion flag is ON (S80: YES). The conversion process shown in FIG. 6 is terminated on condition that the completion flag is ON, that is, the converted amount has reached the threshold converted amount (S80: YES). It is noted that the conversion program 81 of the converting device 70 keeps executing the conversion process on the background until the pre-convert data is converted into the post-convert data.

Next, on condition that the conversion process (S50) is terminated, that is, on condition that the converted amount has reached the threshold converted amount, the mediating program 61 transmits post-convert data transmission instruction to the converting device 70 (S51). The post-convert data transmission instruction is for causing the converting device 70 to transmit the post-convert data. The post-convert data transmission request is received, the conversion program 81 of the converting device 70 retrieves the post-convert data from the data storage area 78B and transmits the retrieved data (i.e., post-convert data) to the mediating device 50 (S52). The mediating program 61 stores the post-convert data received from the converting device 70 to the data storage area 78B. Until the mediating device 50 completes obtaining the post-convert data, the converting program 81 executes the converting process and transmission of the post-convert data to the mediating device 50 in parallel.

Next, the mediating program 61 executes a transmission process to transmit the post-convert data obtained from the converting device 70 to the service providing apparatus 101 (S53, S54). Specifically, the mediating program 61 generates signature information using the token obtained from the MFP 10 in S24 and key information stored, in advance, in the data storage area 58B. Then, the mediating program 61 obtains an upload URL, to which the post-convert data is to be uploaded, from the service providing apparatus 101 using the thus generated signature information, transmits the post-convert data to the upload URL (S53), and receives transmission result information indicating whether the service providing apparatus 101 has normally received the post-convert data from the service providing apparatus 101 (S54).

In S55, the mediating program 61 deciphers the transmission result information received from the service providing apparatus 101. When transmission of the post-convert data has normally completed (S56: YES), the mediating program 61 transmits process completion information to the MFP 10 (S57). The process completion information is for causing the MFP 10 to recognize that the transmission of the post-convert data to the service providing apparatus 101 has normally completed. Then, on condition that the process completion information is received, the image processing program 21 causing the display unit 13 to display completion screen (S58). The completion screen is for notifying the user that the post-convert data has been uploaded to the service providing apparatus 101. Further, on condition that the process completion information has been transmitted, the mediating program 61 deletes data/information (e.g., post-convert data, account information, and type identification information) stored in the data storage area 78B (S59).

When the transmission of the post-convert data abnormally terminated (S56: NO), the mediating program 61 determines whether a threshold time period has elapsed (S60). It is noted that a case where the transmission of the post-convert data terminates abnormally is a case where the transmission process is terminated without execution of predetermined procedures, and includes a case where information indicating the abnormal termination is included in the transmission result information, or a case where the transmission result information cannot be obtained within a predetermined period. Further, the threshold time period is a time period within which transmission of the post-convert data can be retried, examples of which may be ten minutes after the last communication between the MFP 10 and the mediating device 50, and twenty minutes after the service selection screen data is transmitted (S15).

When the threshold time period has not elapsed, (S60: NO), the mediating program 61 returns to S53 and re-executes the transmission process. As execution of S53 and S54 is repeated and the transmission process has not been completed normally until the threshold time period has elapsed (S56: NO, and S60: YES), the mediating program 61 stores the job ID obtained in S43, the account information obtained in S24 and the post-convert data obtained in S52 in the data storage area 58B such that they are associated with each other (S61). Further, the mediating program 61 transmits re-start instruction information to the MFP 10 (S62). The re-start instruction information is information to re-execute the transmission process abnormally terminated, and includes the job ID identifying the abnormally terminated transmission process. The re-start instruction information may be of URL format information.

It is noted that, in S61, the job ID, the account information and the post-convert data are stored in a database or the like such that they are associated with each other. This step, however, should be distinguished from a case where such data is temporarily stored in a buffer or the like. Further, in S61, the job ID, the account information and the post-convert data are stored in a database or the like such that they are associated with each other. But, the invention need not be limited to such a configuration, and for example, each of the job ID, the account information and the post-convert data are stored at a timing when each piece of data is obtained.

On condition that the re-start instruction information is received, the image processing program stores the received re-instruction instruction information in the data storage area 18B. Then, the image processing program 21 causes the display unit 13 to display a standby screen (S11). With this control, the MFP 10 becomes in a state where another process can be executed with remaining upload of the post-convert data to the service providing apparatus 101 uncompleted.

Figure 5A:
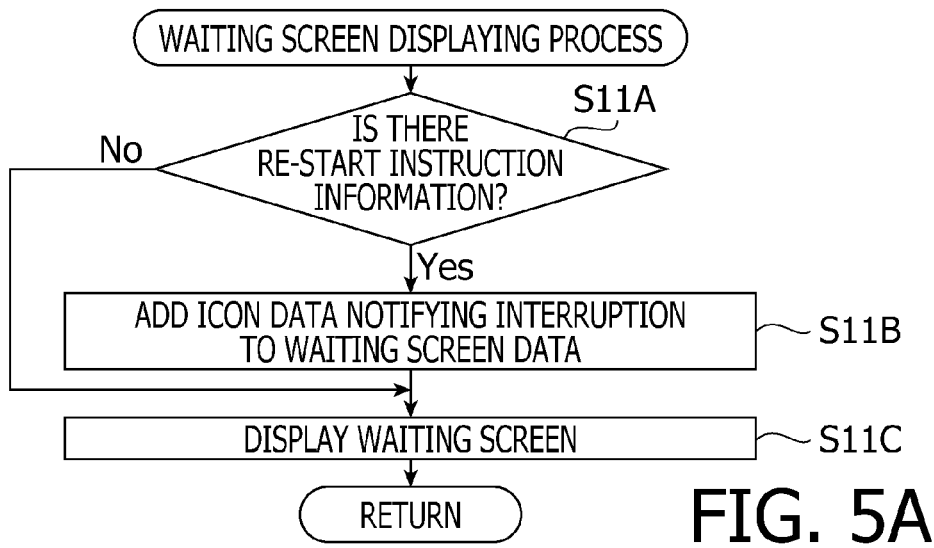
FIG. 5A is a flowchart illustrating a waiting screen display process.
Figure 5B:
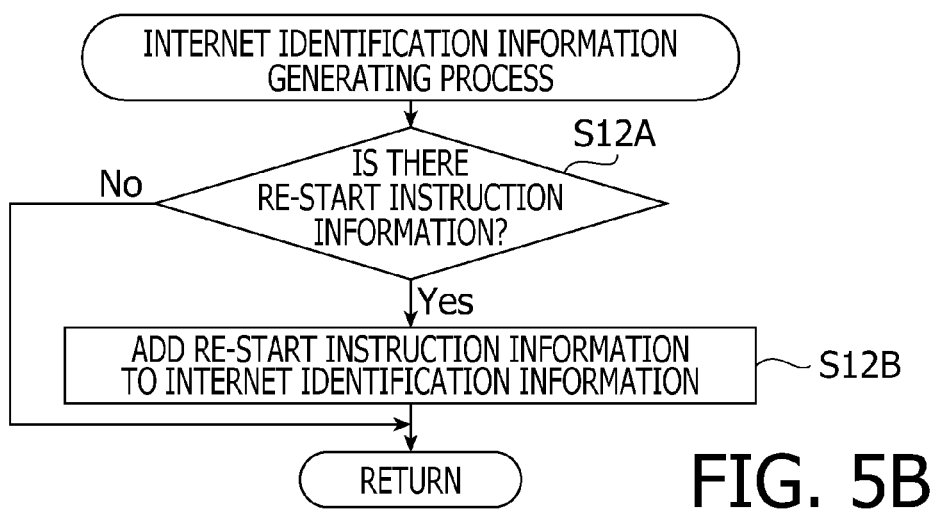
FIG. 5B is a flowchart illustrating an Internet identification information generation process.

It is noted, however, that the image processing program 21 adds icon data notifying an interruption process to the standby screen data (S11B) on condition that the re-start instruction information is stored in the data storage area 18B as shown in FIG. 5A (S11B), and causes the display unit 13 to display a standby screen represented by the standby screen data (S11C). For example, on the display unit 13, a standby screen shown in FIG. 7B may be displayed. It is noted that the standby screen shown in FIG. 7B is different from that shown in FIG. 7A in that an exclamation mark "!" is added in the "Internet" object. According to the first illustrative embodiment, the exclamation mark "!" is an example of an icon notifying that there is a data transmission procedure of the post-convert data to be re-started.

When the operation unit 14 detects an operation to select the "Internet" objects shown in FIG. 7B, the image processing program 221 adds the re-start instruction information (S12) and transmits the Internet identification information to the mediating device 50 (S13) on condition that the re-start instruction information is stored in the data storage area 18B (S12A: YES).

Figure 5C:
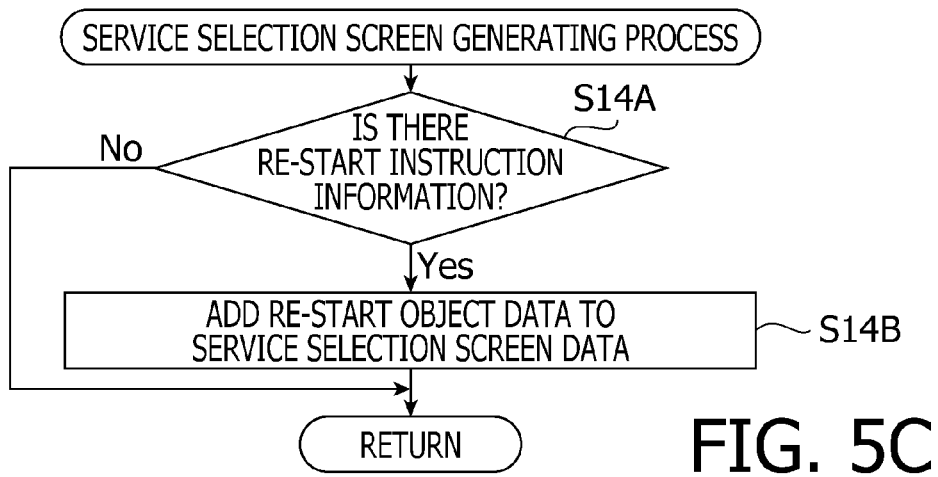
FIG. 5C is a flowchart illustrating a service selection screen generation process.

Next, on condition that the re-start instruction information in added to the received Internet identification information as shown in FIG. 5C (S14A: YES), the mediating program 61 adds re-starting object data to the service selection screen data (S14B) and transmits the service selection screen data to the MFP 10 (S15). Then, the image processing program 21 causes the display unit 13 to display the service selection screen shown (e.g., FIG. 7D) on condition that the service selection screen data to which the re-start instruction object data has been added is received.

Figure 7D:
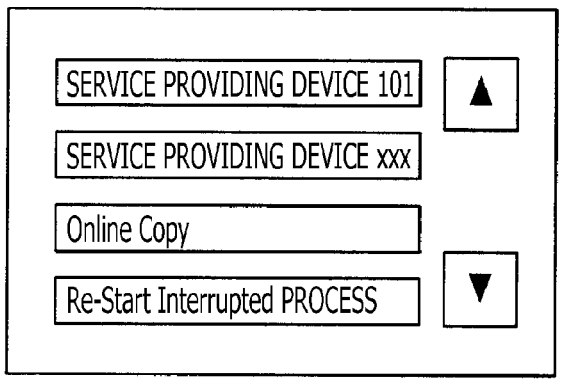

In the service selection screen shown in FIG. 7D, in addition to objects shown in FIG. 7C, a "re-start of interrupted process" is included. Then, on condition that operation of the "re-start of interrupted process" object is detected by the operation unit 14, the image processing program 21 transmits the re-start instruction (S63). The re-start instruction is for causing the mediating device 50 to re-start the abnormally terminated transmission process, and the job ID identifying the abnormally terminated transmission process.

In S64, on condition that the re-start instruction is received, the mediating program 61 obtains the account information and the post-convert data associated with the job ID which has been added to the re-start instruction from the data storage area 58B. Then, the mediating program 61 executes a re-execution process for re-transmitting post-convert data to the service providing apparatus 101 based on the account information and the post-convert data obtained from the data storage area 58B.

According to the first illustrative embodiment, at the timing when the re-start instruction is received from the MFP 10 (S63), the abnormally terminated transmission process is re-executed. With this configuration, for example, when the transmission process is abnormally terminated due to a trouble in the service providing apparatus 101, in response to the user operation of a user who has recognized the trouble, the abnormally terminated transmission process can be re-executed. That is, according to the above configuration, load to the communication network, which may occur since the transmission process is repeatedly executed during the trouble of the service providing apparatus 101, can be suppressed.

On the other hand, the relaying device 40 repeatedly executes the transmission process (S53, S54) until the threshold time period has elapsed (S60). With this configuration, when the transmission process is abnormally terminated due to an instantaneous delay of the communication network, such a transmission process can be completed without requesting the user for an operation. It is noted that, in S60, instead of controlling the process based on the threshold time period, the transmission process (S53, S54) may be repeatedly executed until the number of executions of the transmission process (S53, S54) reaches a predetermined threshold number.

Further, according to the first illustrative embodiment, the account information and the post-convert data which are necessary for re-executing the transmission process are stored in the mediating device 50, and only the re-start instruction is stored in the MFP 10. With this configuration, when the retransmission process is re-executed, it is unnecessary to re-execute the series of processes shown in FIGS. 2-4 from the beginning. Further, such a configuration may not apply excessive load to the storage unit 18 of the MFP 10 which normally has a relatively small capacity. Incidentally, in the illustrative embodiment, an example of using the token is described as the account information. The invention needs not be limited to such a configuration, an a combination of the user ID and password may be used as the account information. In such a case, before the transmission process (S53, S54), it is necessary to receive authentication from the service providing apparatus 101 using the user ID and the password (such a process may be referred to the LOG-IN).

The account information and the post-convert data stored in the data storage area 58B of the mediating device 50 may be deleted after a predetermined retention duration has elapsed. The retention duration may be, for example, one day. The mediating device 50 may transmit screen data of an error screen notifying that the re-start process cannot be executed when the re-start instruction is received after the account information and the post-convert data have been deleted. The image processing program 21 returns to the waiting screen after displaying the error screen on the display unit 13.

It is noted that the order of the screens displayed on the display unit 13 in S16, S21, S26, S32, S35 and S38 needs not be limited to that of the first illustrative embodiment. Further, in the illustrative embodiment, among the plurality of display screens displayed on the display unit 13, the screen firstly displayed after the Internet identification information has been transmitted includes the "re-start of interrupted process" object. The invention needs not be limited to the above configuration. For example, the UL/DL selection screen may include the "re-start of interrupted process" job. Further, in the first illustrative embodiment, the exclamation mark icon ("!") is displayed in the "Internet" object of the waiting screen, and on the screen which is displayed after the "Internet" object is selected, the "re-start of interrupted process" object is displayed. The invention needs not be limited to such a configuration, and the "re-start of interrupted process" object may be included in the waiting screen.

Second Illustrative Embodiment

In the second illustrative embodiment, an "Online Print" process in which the pre-convert data is transmitted from the service providing apparatus 101 to the relaying device 40, the pre-convert data is converted to the post-convert data in the relaying device 40, and the post-convert data is transmitted from the relaying device 40 to the MFP 10 will be described. In the description on the second illustrative embodiment, processes similar to those of the first illustrative embodiment will be omitted for brevity, and processes different from the first illustrative embodiment will be mainly described.

Firstly, the second illustrative embodiment is different from the second illustrative embodiment in that, in S26, the "download" object is selected in the second illustrative embodiment. That is, the mediating program 61 receives the UL/DL identification information indicating that the "download" object is selected in S27. Further, on condition that the direction of data transmission indicated by the UL/DL identification information is "download" (S28: NO), the mediating program 61 transmits the print/medium selection screen data to the MFP 10 (S91). Further, on condition that the print/medium selection screen data is received, the image processing program 21 causes the display unit 13 to display the print/medium selection screen represented by the print/medium selection screen data (S92).

Although not shown, the print/medium selection screen is for causing the user to select processing of the post-convert data, and includes, for example, the "print" object and the "medium" object. When the "print" object is selected, the image represented by the post-convert data is printed on the printing sheet by the printer unit 11. When the "medium" object is selected, the post-convert data is stored in the recoding medium inserted in the medium insertion unit 15. In the following description on the second illustrative embodiment, it is assumed that the "print" object has been selected. It is noted that, when the "medium" object is selected, the format selection process shown in S34-S36 is executed, and a process of storing the post-convert data in the recoding medium inserted in the medium insertion unit 15 is executed in S116.

Next, on condition that an operation to select the "print" object displayed on the display unit 13 is detected by the operation unit 14, the image processing program 21 transmits print identification information indicating that the selected object is selected to the mediating device 50 (S93). Since the data format the printer unit 11 employs is the image format, the print identification information includes information indicating the format of the post-convert data is the image format.

In S94, on condition that the print identification information is received, the mediating program 61 transmits file information transmission instruction to the service providing apparatus 101 using the account information obtained from the MFP 24 in S24. The file information transmission instruction is for causing the service providing apparatus 101 to transmit the file information including a file list showing files to which the user corresponding to the account information can access. Then, on condition that the file information is received, the mediating program 61 generates file selection screen data (S96) and transmits the file selection screen data to the MFP 10 (S97).

Next, on condition that the file selection data is received, the image processing program 21 causes the display unit 13 to display the file selection screen represented by the received file selection screen data (S98). Although not shown, the file selection screen is a screen on which the file list included in the file information received in S95 is displayed as a list of objects. That is, the files displayed on the file selection screen are files which could be candidates of the pre-convert data. Then, the selected file which is selected on the file selection screen is the pre-convert data according to the second embodiment.

On condition that an operation to select one of the objects displayed on the display unit 13 is detected by the operation unit 14, the image processing program 21 transmits selection file list information which is a list of files corresponding to the selected object to the mediating device 50 (S99). The selection file list includes information identifying one or more files selected on the file selection screen. Further, on condition that the selection file list information is received, the mediating program 61 stores the selected file list information in the data storage area 58B (S100). Further, the mediating program 61 transmits the print setting screen data to the MFP 10 (S101).

Next, on condition that the print setting screen data is received, the image processing program 21 causes the display unit 13 to display a print setting screen represented by the print setting screen data (S102). Although not shown, the print setting screen is for causing the user to select execution condition of the print process executed by the printer unit 11. For example, the print setting condition may include objects for selecting/setting the size of the printing sheet, resolution, monochromatic/color images. Then, on condition that an operation of selecting one of the objects displayed on the display unit 13 is detected by the operation unit 14, the image processing program 21 transmits the print setting identification information indicating that the selected object is selected to the mediating device 50 (S103).

On condition that the print setting identification information is received, the mediating program 61 issues the job ID (S104) and initialize the variable (S105). Then, the mediating program 61 obtains the pre-convert data URL of a file (i) from the service providing apparatus 101, and transmits the pre-convert data transmission instruction of the file (i) indicated by the pre-convert data URL to the service providing apparatus 101 (S106). Then, the mediating program 61 obtains the pre-convert data of the file (i) from the service providing apparatus 101 (S107).

Next, the mediating program 61 transmits the obtained pre-convert data to the converting device 70 (S108), and receives transmission result information from the converting device 70 (S109). Thereafter, the conversion process shown in FIG. 6 is executed (S110). For example, if the format of the pre-convert data is the Office format, the pre-convert data is converted such that the post-convert data has the image format, according to the second illustrative embodiment. Since the converting process has been described in detail, it will not be repeated for brevity.

In S111, on condition that the converting process (S110) is completed, that is, on condition that the converted amount has reached the threshold converted amount, the mediating program 61 transmits the post-convert data information transmission instruction to the converting device 70 (S111). The post-convert data information transmission instruction is for causing the converting device 70 to transmit post-convert data information which indicates a location of the post-convert data in the converting device 70. The post-convert data information may be URL format information. The mediating program 61 receives the post-convert data information from the converting device 70 (S112). Further, the mediating program 61 transmits the post-convert data information obtained in S112 and interruption notification information to the MFP 10 (S113). The interruption notification information is for indicating a destination to which interruption of reception of the post-convert data in the MFP 10 is notified. The interruption notification information may be URL format information.

In S114, on condition that the post-convert data information and the interruption notification information are received, the image processing program 21 transmits the post-convert data transmission instruction to the converting device 70. The post-convert data transmission instruction is for causing the converting device 70 to transmit the post-convert data identified by the post-convert data information obtained in S113. Further, on condition that the post-convert data transmission instruction is received, the converting program 81 transmits the post-convert data to the MFP 10 (S115).

Next, in S116, the image processing program 21 causes the printer unit 11 to execute the printing process to print the image represented by the received post-convert data in accordance with the print setting identification information set in S103. It is noted that the print process (S116) is started before completion of reception of the post-convert data. For example, when the post-convert data includes a plurality of pages of data, the printer unit 11 may start the print process (S116) on condition that the printer unit 11 has received one page of post-convert data. That is, the image processing program 21 executes reception of the post-convert data and execution of print process in parallel.

When the print process has been completed normally (S117: YES), the image processing program 21 transmits print completion information to the mediating device 50 (S118). The print completion information is for causing the mediating device 50 to recognize that the print process using the post-convert data obtained in S115 has completed normally. A case where the print process has completed normally is a case where all the images represented by the post-convert data obtained in S115 have been printed on the printing sheets.

Next, on condition that the print completion information is received, the mediating program 61 updates a print state of the file (i) from "non-completed" to "completed" (S119) and determines whether the print states of all the files included in the selection file list has been updated to "completed" (S120). When there remains a file of which print state is "non-completed" (S120: NO), the mediating program 61 increments a variable "i" (S121), and re-executes steps S106-S120.

When the print states of all the files are "completed" (S120: YES), the mediating program 61 transmits process completion information to the MFP 10 (S122). On condition that the process completion information is received, the image processing program 21 causes the display unit to display a completion screen (S123). Further, on condition that the process completion information is transmitted, the mediating program 61 deletes the data and information stored in the data storage area 78B (S124).

Further, the mediating device 50 may cause the converting device 70 to delete the post-convert data stored in the data storage area 78B by transmitting the process completion notification to the converting device 70. Alternatively, the converging device 70 may be configured to delete the post-convert data when a predetermined period has elapsed after the converting process is executed. In the latter case, transmission of the process completion notification between the mediating device 50 and the converting device 70 can be omitted.

When the print process has not completed normally (S117: NO), the image processing program 21 determines whether a threshold time period has elapsed (S125). It is noted that a case where the print process has not completed normally is a case, for example, where the printer unit 11 runs short of the printing sheets, ink and/or toner. If the threshold time period has not elapsed (S125: NO), the print unit 11 returns to S116 and re-executes the print process. That is, the printer unit 11 re-execute the print process as the above problems have been resolved by the user.

When the print process has not completed before the threshold time period has passed (S117: NO, S125: YES), the image processing program 21 transmits an interruption instruction to the mediating device 60 (S126). The interruption instruction is for causing the mediating device 50 to recognize that the print process using the post-convert data obtained in S115 has not completed normally, and includes a re-start page position. The re-start page position is information identifying the page subjected to the next print process in the post-convert data having a plurality of pages. A method of identifying the re-start page position is not limited to a particular method. In one example, the page subjected to the next print process may be identified by the page number. In another example, the page subjected to the next print page may be designated by identifying the last page of the previous print process.

Next, on condition that the interruption instruction is received, the mediating program 61 determines that the transmission process in S115 is abnormally terminated. Then, on condition that the interruption instruction is received, the mediating program 61 stores the job ID issued in S104, the conversion ID obtained in S72 and the re-start page position included in the interruption instruction in the data storage area 58B in a mutually associated manner. Further, the mediating program 61 transmits the re-start instruction information to the MFP 10 (S128).

The transmission process (S115) according to the second illustrative embodiment is considered to be completed normally on condition that the all the images represented by the post-convert data have been printed by the printer unit 11. In other words, according to the second illustrative embodiment, even when the post-convert data has already been received by the MFP 10, the transmission process (S115) may be determined to complete abnormally on condition that the print process (S116) using the post-convert data has not completed normally.

Next, on condition that the re-start instruction information is received, the image processing program 21 stores the re-start instruction information in the data storage area 18B. Then, the image processing program 21 causes the display unit 13 to display the waiting screen (S11). With the above control, the MFP 10 is in a condition of executing other processes with the print process of the post-convert data not being completed. Then, similar to the first illustrative embodiment, on condition that the re-start instruction object is selected (S17: YES), the image processing program 21 transmit the re-start instruction (S129).

In S130, on condition that the re-start instruction is received, the mediating program 61 obtains the converted ID associated with the job ID included in the re-start instruction and the re-start page position from the data storage area 58B. Further, the mediating program 61 transmits the post-convert data information transmission instruction to the converting device 70 (S131), and receives the post-convert data information from the converted device 70 (S132). Then, the mediating program 61 transmit the post-convert data information obtained in S132 and the interruption notification information to the MFP 10 (S133). It is noted that, to the post-convert data information transmitted in S133, the re-start page position is added which is obtained in S130.

Next, on condition that the post-convert data information and the interruption notification information are received, the image processing program 21 re-transmits the post-convert data transmission instruction to the converting device 70 (S114). Further, on condition that the post-convert data information is received, the converting program 81 executes the re-start process of re-transmitting the post-convert data to the MFP 10 (S115).

The printer unit 11 executed the print process using the post-convert data received in S115, based on the re-start page position obtained from the mediating device 50 in S133 (S116). Specifically, the printer unit 11 prints only a page identified by the re-start page position and subsequent pages of the post-convert data, without printing pages before the page identified by the re-start page position.

According to the second illustrative embodiment, the transmission process abnormally terminated is re-executed at a timing of receiving the re-start instruction from the MFP 10 (S129). According to this configuration, when the transmission process is abnormally terminated due to the causes on the MFP 10 side (e.g., running short of sheets, ink, toner or the like), the abnormally terminated transmission process can be re-executed in response to the user's recognition that the causes of the abnormal termination has been eliminated.

It is noted that the mediating device 50 according to the second illustrative embodiment is configured to transmit the re-start page position to the MFP 10 prior to the re-start process. Further, the converting device 70 transmits the post-convert data to the MFP 10 from the top thereof. The MFP 10 prints only the page identified by the re-start page position and subsequent pages of the post-convert data obtained from the converting device 70.

However, the invention needs not be limited to the above configuration. For example, the mediating device 50 may cause the converting device 70 to transmit post-convert data information to transmit a part of the post-convert data corresponding to the page identified by the re-start page position and the subsequent pages in the post-convert data information transmission instruction in S131. Then, the converting program 81 may be configured to obtain the post-convert data transmission instruction based on such post-convert data information (S114), and transmit only the part of the post-convert data corresponding to the page identified by the re-start page position and the subsequent pages (S115). Such a process is particularly advantageous, for example, when the post-convert data information is assigned to each page of the post-convert data.

Third Illustrative Embodiment

Figure 2:
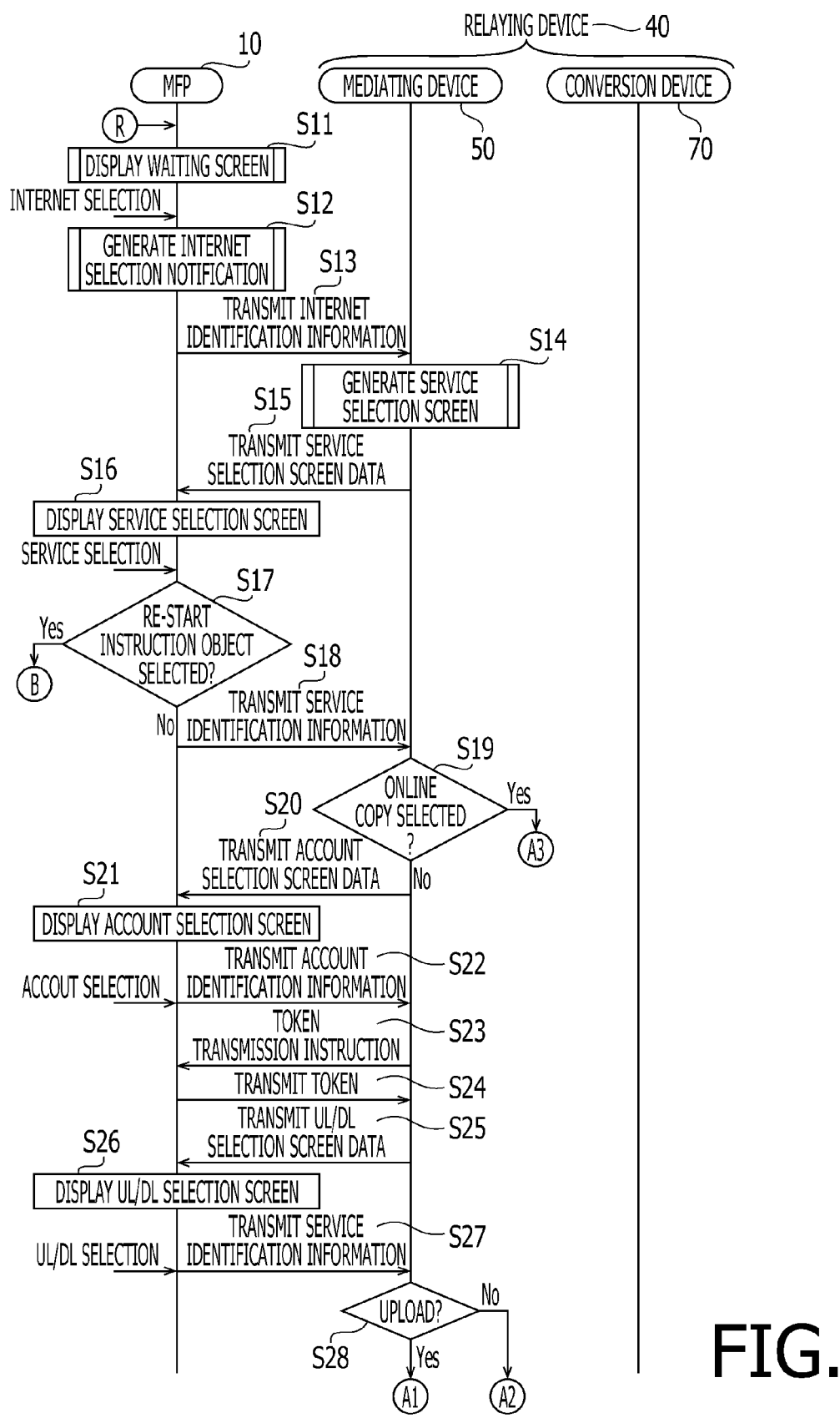
FIGS. 2-4 are sequence charts of the data management system according to the first illustrative embodiment.
Figure 3:
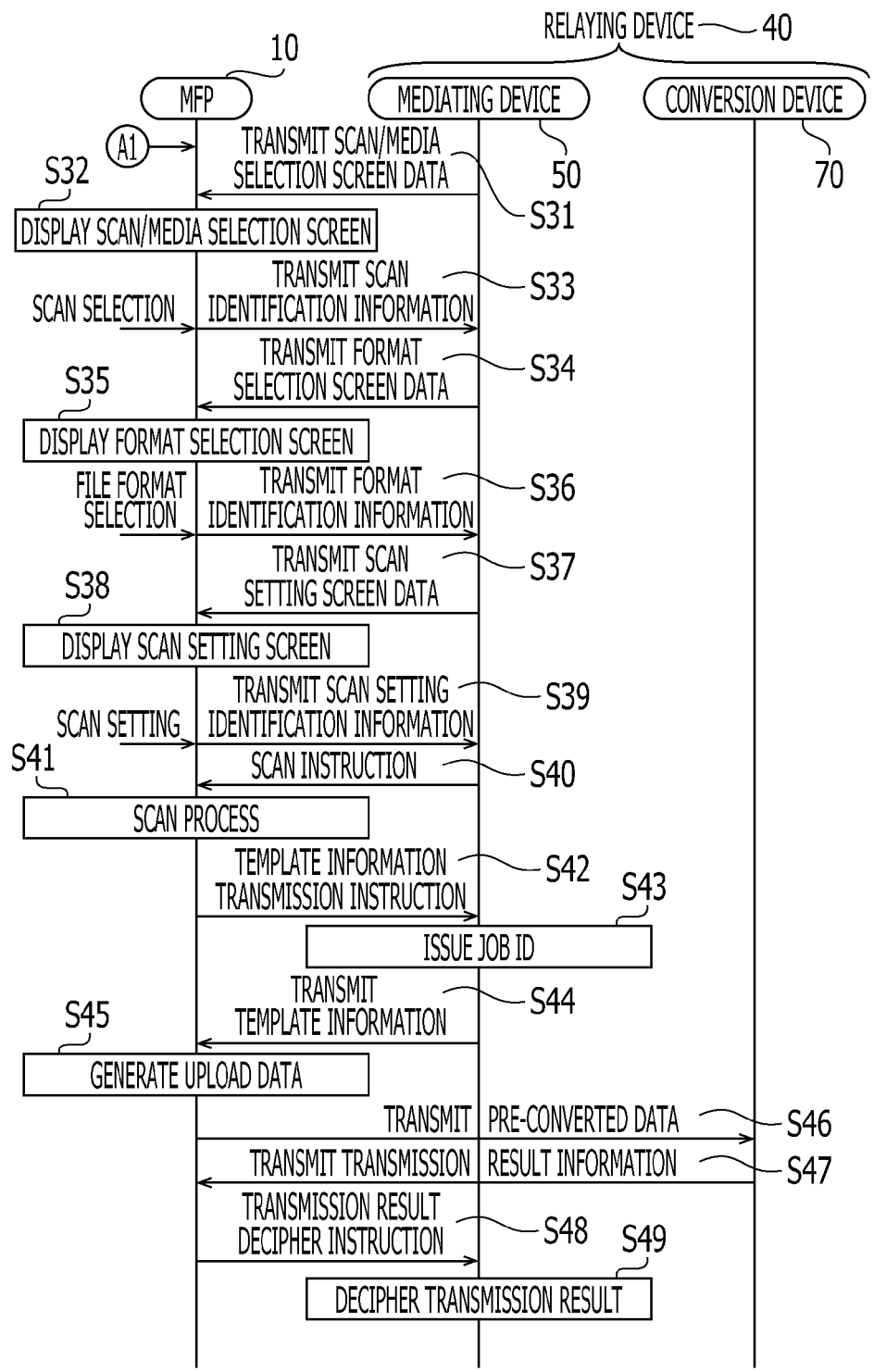
Figure 4:
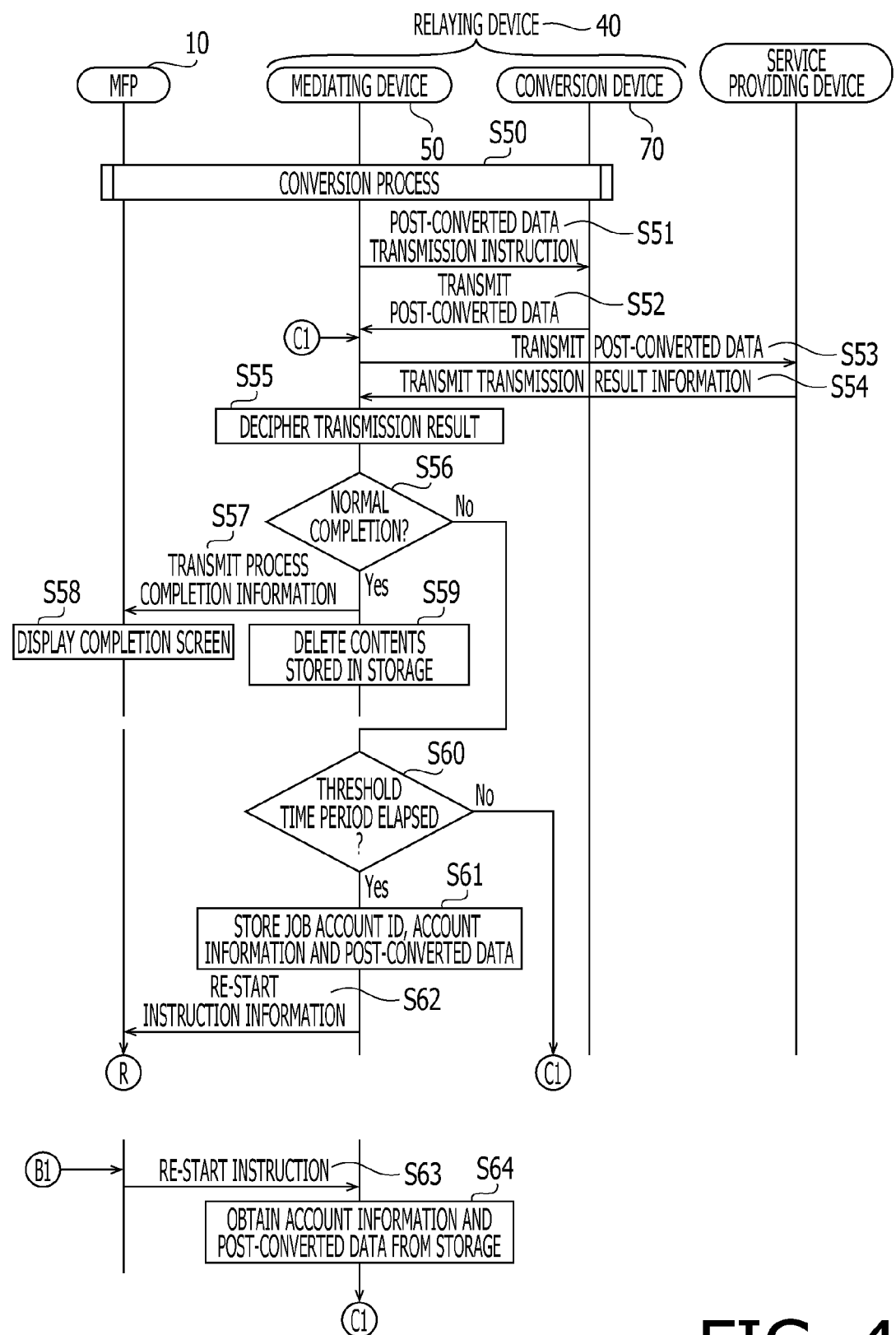
Figure 11:
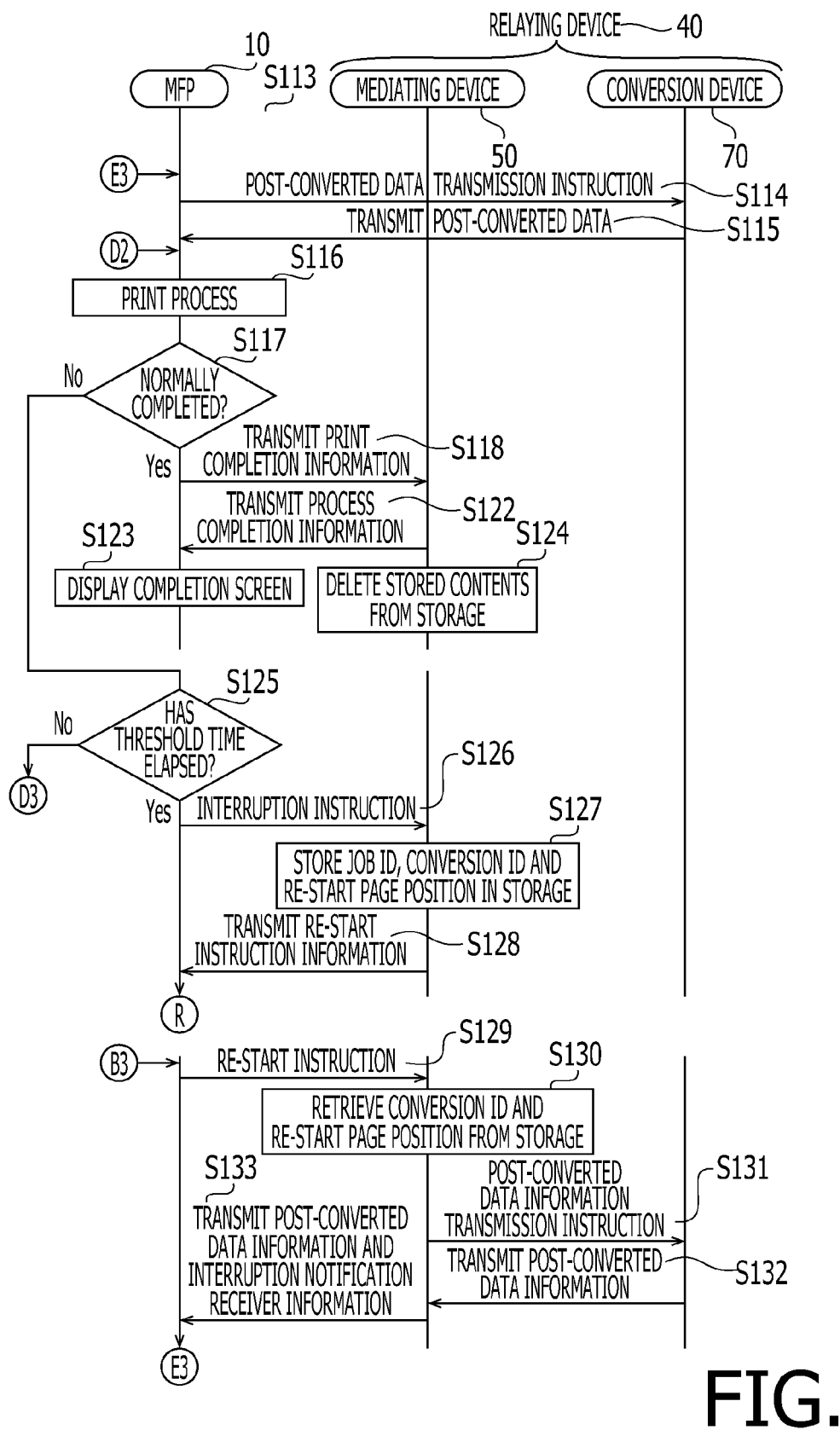

Referring to FIGS. 2, 10 and 11, the data management system 100 according to the third illustrative embodiment will be described. According to the third illustrative embodiment, an "Online Copy" in which the pre-convert data is transmitted from the MFP 10 to the relaying device 40, the pre-convert data is converted to the post-convert data by the relaying device 40, and the post-convert data is transmitted from the relaying device 40 to the MFP 10 will be described. In the following description, operations similar to those in the first and/or second illustrative embodiments will be omitted for brevity and different operations with respect to the first/second illustrative embodiments will be mainly described.

According to the third illustrative embodiment, the "Online Copy" is selected at S16 of FIG. 2, which is different from the first/second illustrative embodiment. The mediating program 61 receives the service identification information indicating that the "Online Copy" is selected (S18). The service identification information includes information indicating that the format of the post-convert data is the image format.

When the "Online Copy" object is selected (S19: YES), the mediating program 61 transmits the scan/medium selection screen data to the MFP 10 (S141). Further, on condition that the scan/medium selection screen data is received, the scan/medium image processing program 21 causes the display unit 13 to display a scan/medium selection screen (S142). In the following description on the third illustrative embodiment, it is assumed that the "medium" object is selected.

The image processing program 21 causes the display unit 13 to display the file selection screen (S143). The file selection screen is a screen showing files stored in the recording medium inserted in the medium insertion unit 14 are displayed as a list of flies which are selectable objects. That is, the files displayed in the file selection screen are candidates of the pre-convert data in the third illustrative embodiment. A selected file on the file selection screen is used as the pre-convert data according to the third illustrative embodiment. In the following description, it is assumed that an Office file is selected as the pre-convert data.

Figure 8:
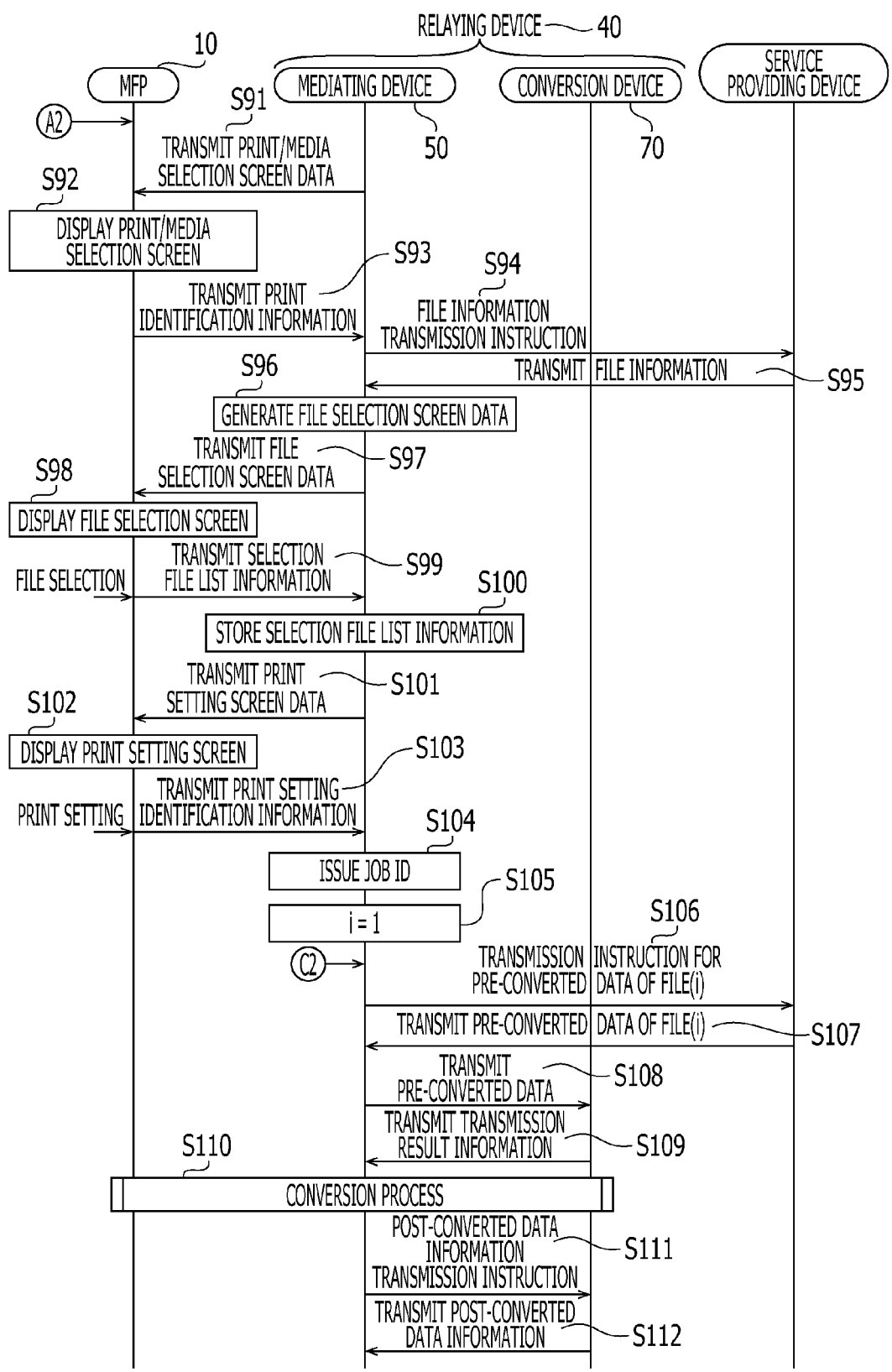
FIGS. 8 and 9 are sequence charts of a data management system according to a second illustrative embodiment.
Figure 9:
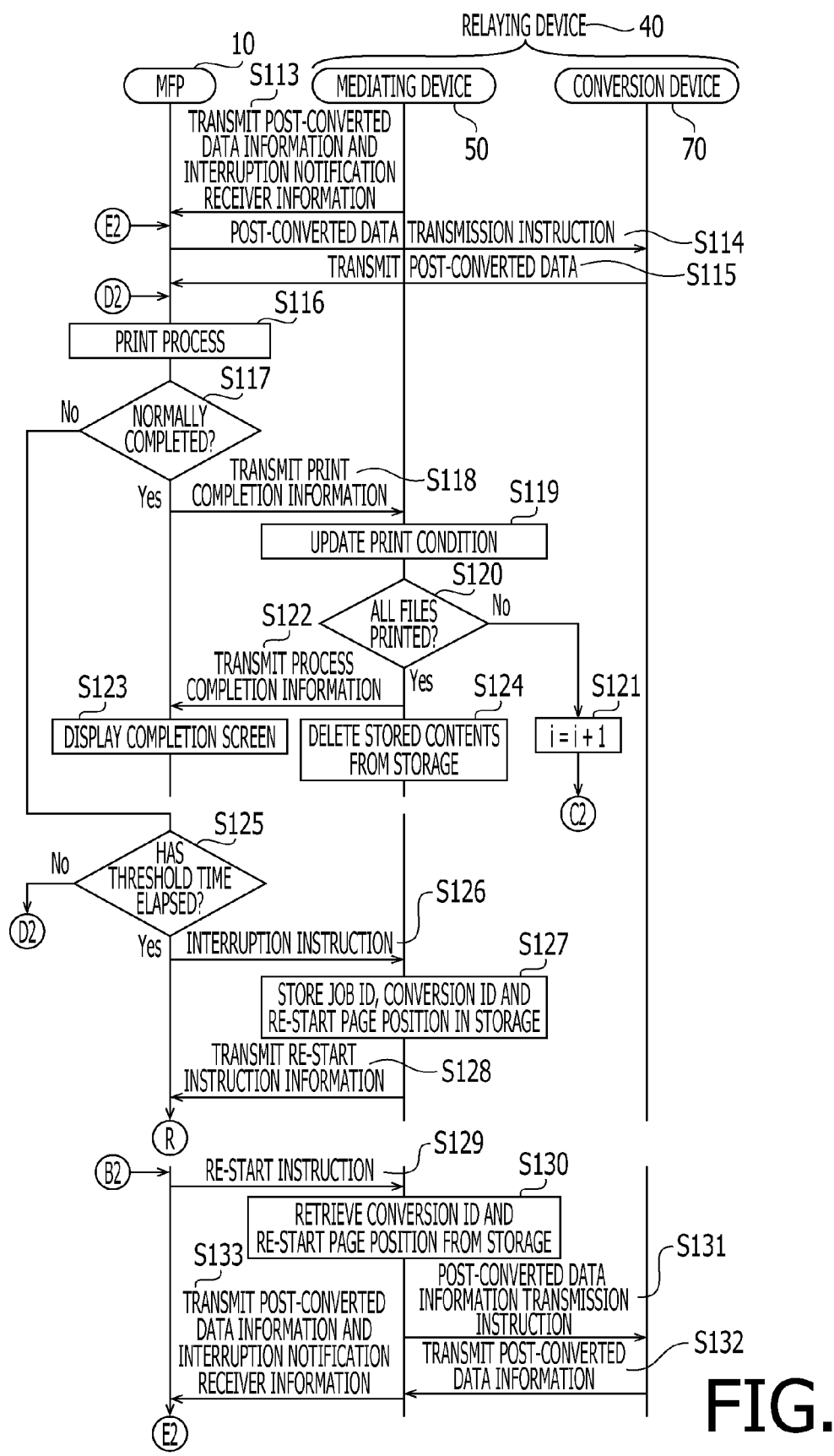

The converting program 81 obtains the pre-convert data from the MFP 10, and executes the conversion process to convert the pre-convert data (S42-S50). This converting steps are similar to those of the first illustrative embodiment, description thereof will not be repeated. Next, the conversion program 81 transmits the post-convert data to the MFP 10 and stores the image represented by the post-convert data in the recording medium (S111-S133). These steps are similar to those in the second illustrative embodiment, and description thereof will be omitted. It is noted that, according to the third illustrative embodiment, only one file is selected on the file selection screen. Therefore, S105, S119-S121 of FIGS. 8 and 9 are omitted in the third illustrative embodiment. Of course, the above steps may be incorporated in the configuration of the third illustrative embodiment.

According to the third illustrative embodiment, the transmission process abnormally terminated is re-executed at a timing of receiving the re-start instruction from the MFP 10

(S129). According to this configuration, when the transmission process is abnormally terminated due to the causes on the MFP 10 side (e.g., running short of sheets, ink, toner or the like), the abnormally terminated transmission process can be re-executed in response to the user's recognition that the causes of the abnormal termination has been eliminated.

In the first—third illustrative embodiments, one of the processes of "Office Doc Creator", "Online Print" and "Online Copy" is selected to be executed in accordance with a combination of the object selected in the service selection screen (S16) and the object selected in the UL/DL selection screen (S26). However, the invention needs not be limited to such a configuration and can be modified in various ways.

For example, the processes of "Office Doc Creator", "Online Print" and "Online Copy" which is determined based on a combination of selected objects may be displayed on the display unit 13 as selectable objects, respectively. In such a case, the "Online Copy" object can be eliminated from the service selection screen, and further, steps S25-S28 can be skipped.

In the MFP 10 of each of the above-described illustrative embodiments, each process can be executed as the CPU 17 executes various programs stored in the program storage area 18A. It is noted, however, the configuration needs not be limited to the above-described illustrative embodiments. For example, at least a part of the controller unit may be realized by hardware such as an IC (integrated circuit) or the like. So is the mediating device 50 or the converting device 70.

The above-described configurations can be realized as an image processing apparatus, or one or more programs causing the image processing apparatus to execute the processes described above. Such programs may be stored in a non-transitory recording medium and distributed. Alternatively, information or signals representing the programs may be transmitted via a communication network such as the Internet. So is the mediating device 50 or the converting device 70.

It is noted that, in the specification, a term "abortion of a transmission process" or "abnormal termination of a transmission process" is used to mean that the transmission process is terminated without a predetermined procedure is executed. For example, a case where one of a data transmission device and a data receiving device detects an error and notifies an occurrence of the error to the other of the data transmission device and the data receiving device, and a data transmission process therebetween is terminated, the transmission process is considered to be abnormally terminated, according to the above definition. For another example, a case where a communication between a data transmission device and a data receiving device is terminated due to timeout is also considered to be abnormally terminated.

It is noted that, in the specification, a term "conversion" (or "convert") all the processes of applying processing, editing, extracting and the like to a pre-convert data having a first format and generating post-convert data having a second format which is different from the first format. For example, a process of generating image data from Office format data is considered to be a conversion, according to the above definition. In this example, the Office format is the first format and the image format is the second format. For another example, a process of extracting predetermined information from image data and generating CSV ("CSV" is an abbreviation for "comma-separated values") data having a CSV format. In this example, the image format is the first format and the CSV format is the second format, according to the above definition. It is noted that the Office format is a format which is normally generated by Office software provided by Microsoft® Corporation.

It is noted that, throughout the specification, a term "data" and a term "information" are basically used to represent different meanings. Specifically, both the "data" and the "information" represent bits or bit sequence handled by a computer. When the computer handles the "data," it is unnecessary for the computer to recognize a meaning each bit represents, while, when the computer handles the "information," an operation of the computer is diverged based on a meaning each bit of the "information" represents. Additionally, a term "instruction" represents a control signal encouraging a device at a destination to encourage a next operation, and may include the "information" therein or the "instruction" may have a characteristic of the "information."

It is noted that the "data" and the "information" are treated as the same "data" and "information" even if the format thereof is changed for respective computers handling the "data" and "information" as far as what is meant thereby or represent thereby is the same. That is, the same "data" or "information" may be retained in the text format in one computer, and may be retained in the binary format in another computer.

It is further noted that the above defined distinction between the "data" and "information" should not be considered too strictly, and an exceptional treatment should also be allowed. For example, "data" may be treated as "information" temporarily, or the "information" may be treated as "data" temporarily. For another example, "data" in one device may be treated as "information" in another device. Further, "information" may be extracted from "data" or "data" may be extracted from "information."

What is claimed is:

1. An image processing apparatus configured to be connected to a server apparatus and a relaying device through a communication network, the relaying device being configured to relay data from one of the image processing apparatus and the server apparatus to the other through the network, the relaying device having a first communication unit, a first storage unit, and a first controller, the first controller being configured to:
  receive first data from one of the image processing apparatus and the server apparatus via the communication unit;
  execute a conversion process of converting the first data having a first format to second data having a second format which is different from the first format;
  execute a transmission process of causing the communication unit to transmit the second data to the other of the image processing apparatus and the server apparatus;
  on condition that the transmission process is abnormally terminated, cause the communication unit to transmit process identification information identifying the transmission process which is abnormally terminated to the image processing apparatus;
  cause the storage unit to store the process identification information and the second data in associated manner;
  receive a re-start instruction which is received from the image processing apparatus via the communication unit, the re-start instruction including the process identification information identifying the transmission process to be re-started; and
  on condition that the transmission process is abnormally terminated and the re-start instruction is received, execute a re-start process which obtains second data associated with the process identification information from the storage unit, and cause the communication unit to transmit the obtained second data to the other of the image processing apparatus and the server apparatus, the image processing apparatus comprising:
a second communication unit;
an operation unit configured to detect an operation to select an object displayed on a display screen;
a second storage unit; and
a second controller,
the second controller being configured to:
- cause the second communication unit to transmit the first data to the relaying device or cause the second communication unit to receive the second data from the relaying device;
- receive the process identification information received from the relaying device via the second communication unit;
- cause the second storage unit to store the process identification information; and
- on condition that a selection of a re-start instruction object displayed on the display screen is detected by the operation unit, cause the second communication unit to transmit the re-start instruction including the process identification information stored in the second storage unit to the relaying device.

2. An image processing system having an image processing apparatus, a server apparatus and a relaying device interconnected through a communication network, the relaying device being configured to relay data from one of the image processing apparatus and the server apparatus to the other through the network, the relaying device comprising:
a first communication unit;
a first storage unit; and
a first controller,
the first controller being configured to:
- receive first data from one of the image processing apparatus and the server apparatus via the communication unit;
- execute a conversion process of converting the first data having a first format to second data having a second format which is different from the first format;
- execute a transmission process of causing the communication unit to transmit the second data to the other of the image processing apparatus and the server apparatus;
- on condition that the transmission process is abnormally terminated, cause the communication unit to transmit process identification information identifying the transmission process which is abnormally terminated to the image processing apparatus;
- cause the storage unit to store the process identification information and the second data in associated manner;
- receive a re-start instruction which is received from the image processing apparatus via the communication unit, the re-start instruction including the process identification information identifying the transmission process to be re-started; and
- on condition that the transmission process is abnormally terminated and the re-start instruction is received, execute a re-start process which obtains second data associated with the process identification information from the storage unit, and cause the communication unit to transmit the obtained second data to the other of the image processing apparatus and the server apparatus, the image processing apparatus comprising:
a second communication unit;
an operation unit configured to detect an operation to select an object displayed on a display screen;
a second storage unit; and
a second controller,
the second controller being configured to:
- cause the second communication unit to transmit the first data to the relaying device or cause the second communication unit to receive the second data from the relaying device;
- receive the process identification information received from the relaying device via the second communication unit;
- cause the second storage unit to store the process identification information; and
- on condition that a selection of a re-start instruction object displayed on the display screen is detected by the operation unit, cause the second communication unit to transmit the re-start instruction including the process identification information stored in the second storage unit to the relaying device.

* * * * *